(12) United States Patent
Luo et al.

(10) Patent No.: US 7,965,759 B2
(45) Date of Patent: Jun. 21, 2011

(54) SYNCHRONIZATION CODES FOR WIRELESS COMMUNICATION

(75) Inventors: Tao Luo, San Diego, CA (US); Durga Prasad Malladi, San Diego, CA (US); Juan Montojo, San Diego, CA (US)

(73) Assignee: Qualcomm Incorporated, San Diego, CA (US)

( * ) Notice: Subject to any disclaimer, the term of this patent is extended or adjusted under 35 U.S.C. 154(b) by 851 days.

(21) Appl. No.: 11/552,424

(22) Filed: Oct. 24, 2006

(65) Prior Publication Data

US 2007/0133390 A1 Jun. 14, 2007

Related U.S. Application Data

(60) Provisional application No. 60/731,114, filed on Oct. 28, 2005.

(51) Int. Cl.
*H04B 1/707* (2006.01)
(52) U.S. Cl. .................................................... 375/146
(58) Field of Classification Search .................. 375/130, 375/140, 146, 147, 259, 260, 150
See application file for complete search history.

(56) References Cited

U.S. PATENT DOCUMENTS

| 7,054,088 B2* | 5/2006 | Yamazaki et al. ............ 360/65 |
| 2001/0021199 A1* | 9/2001 | Lee et al. ............ 370/503 |
| 2003/0012270 A1* | 1/2003 | Zhou et al. ............ 375/150 |
| 2005/0002360 A1* | 1/2005 | Lamontagne et al. ........ 370/335 |

FOREIGN PATENT DOCUMENTS

| TW | 474070 | 1/2002 |
| TW | 490981 | 6/2002 |
| TW | 494646 | 7/2002 |

OTHER PUBLICATIONS

International Search Report and Written Opinion—PCT/US2006/060290, International Search Authority—European Patent Office—May 16, 2007.
Taiwanese Search report—TW095139931—TIPO—Mar. 12, 2010.
"Universal Mobile Telecommunications System ( UMTS )" ETSI Standards, European Telecommunications Standards Institute, Sophia-Antipo, FR, vol. 3-R1, No. V530, Mar. 2003, XP014008505.
Wang Y-P E et al: "Cell search in W-CDMA" IEEE Journal on Selected Areas in Commcation, IEE Service Center, Piscatway, NJ, US, vol. 18, No. 8, Aug. 2000, pp. 1470-1482, XP002204578.

\* cited by examiner

*Primary Examiner* — Kevin M Burd
(74) *Attorney, Agent, or Firm* — Milan Patel; Larry Moskowitz

(57) ABSTRACT

Techniques for supporting synchronization in wireless communication are described. A Node B generates a primary synchronization code (PSC) having a length of L chips based on a first inner sequence and a first outer sequence, where L is less than 256. The Node B also generates a sequence of secondary synchronization codes (SSCs) based on a second inner sequence and a second outer sequence, with each SSC having a length of L chips. L may be equal to 64, and the PSC and SSCs may have lengths of 64 chips. The Node B sends the PSC in each slot of each frame and sends the sequence of SSCs in each frame, one SSC in each slot. A user equipment (UE) detects for the PSC and then detects for the sequence of SSCs using slot timing from the PSC detection. The UE may perform PSC detection using correlation results for the SSCs.

43 Claims, 12 Drawing Sheets

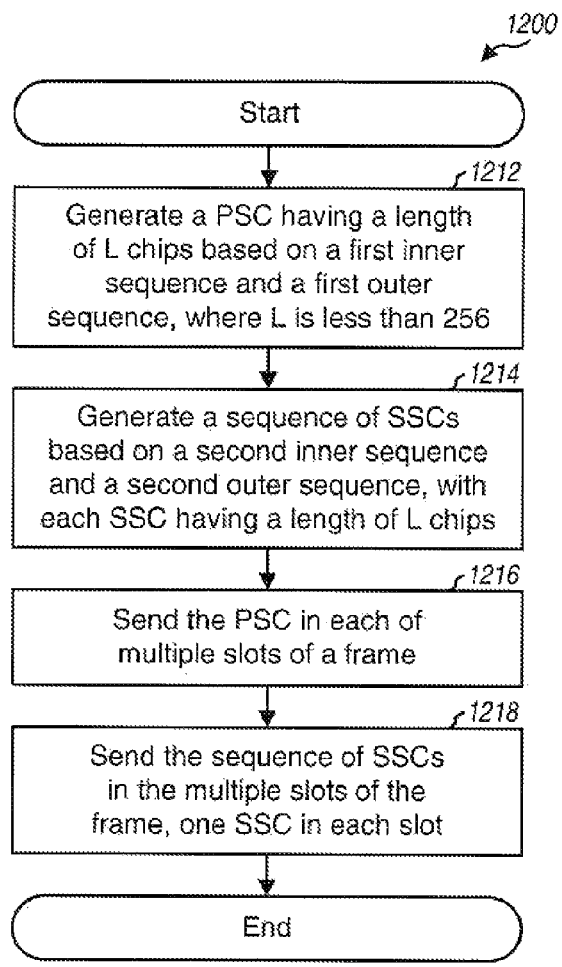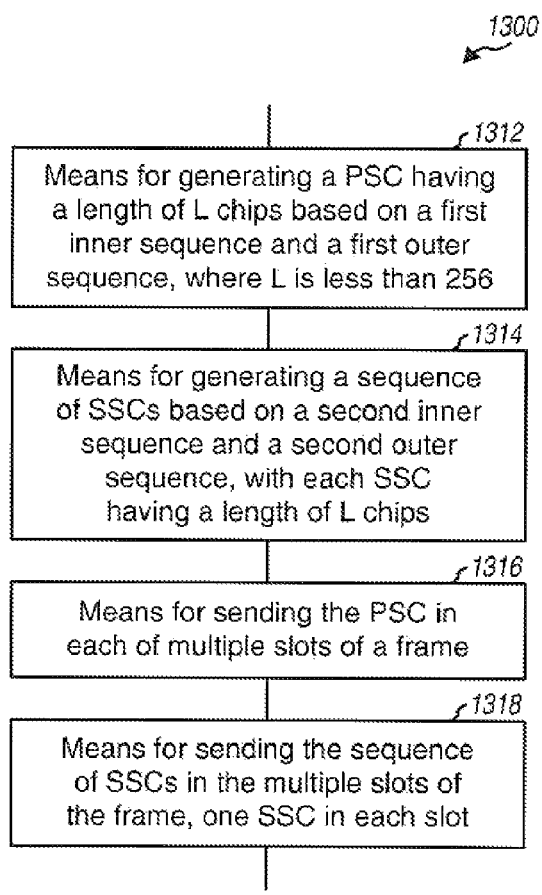
FIG. 12
FIG. 13

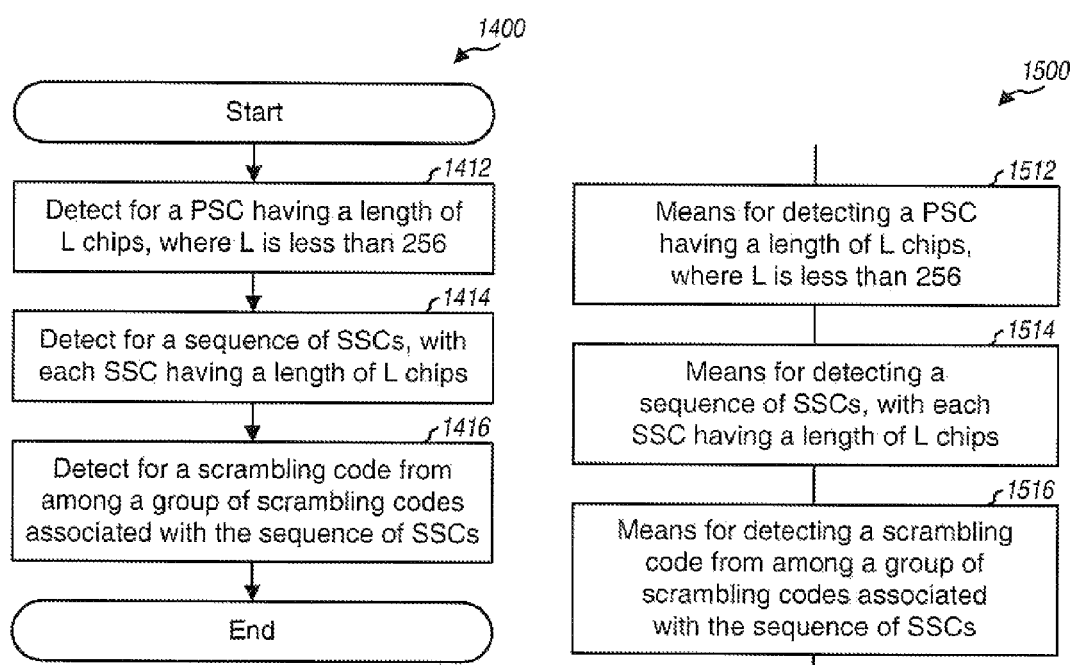

SYNCHRONIZATION CODES FOR WIRELESS COMMUNICATION

The present application claims priority to provisional U.S. Application Ser. No. 60/731,114, entitled "SYNCHRONIZATION CODES FOR LOW CHIP RATE OF UMTS," filed Oct. 28, 2005, assigned to the assignee hereof and incorporated herein by reference.

BACKGROUND

I. Field

The present disclosure relates generally to communication, and more specifically to synchronization techniques for wireless communication.

II. Background

Wireless communication systems are widely deployed to provide various communication services such as voice, video, packet data, messaging, broadcast, etc. These systems may be multiple-access systems capable of supporting communication for multiple users by sharing the available system resources. Examples of such multiple-access systems include Code Division Multiple Access (CDMA) systems, Time Division Multiple Access (TDMA) systems, Frequency division Multiple Access (FDMA) systems, Orthogonal FDMA (OFDMA) systems, and Single-Carrier FDMA (SC-FDMA) systems.

A wireless communication system may include many base stations (or Node Bs) that support communication for many user equipments (UEs). A UE (e.g., a cellular phone) may be within the coverage of zero, one or multiple base stations at any given moment. The UE may have just been powered on or may have lost coverage and thus may not know which base stations can be received. The UE may perform synchronization to detect for base stations and to acquire timing and other information for the detected base stations.

Each base station may generate a synchronization signal with one or more known codes and transmit this signal to assist the UEs perform detection and timing acquisition. The synchronization signal represents overhead and should be sent as efficiently as possible. Furthermore, the synchronization signal should allow the UEs to perform detection and timing acquisition as quickly and robustly as possible.

SUMMARY

Techniques for supporting synchronization in wireless communication are described herein. In one aspect, a transmitter (e.g., a Node B) in a wireless communication system generates a primary synchronization code (PSC) having a length of L chips based on a first inner sequence and a first outer sequence, where L is less than 256. The transmitter also generates a sequence of secondary synchronization codes (SSCs) based on a second inner sequence and a second outer sequence, with each SSC having a length of L chips. In one design, L is equal to 64, the PSC has a length of 64 chips, and each SSC also has a length of 64 chips. The inner and outer sequences may be defined as described below. The transmitter may send the PSC in each slot of a frame and may send the sequence of SSCs in multiple slots of the frame, one SSC in each slot. In each slot, the transmitter may send the PSC and SSC in parallel, in different time intervals, or on different subcarriers. All Node Bs in the system may transmit the same PSC, and different Node Bs may transmit different sequences of SSCs.

In another aspect, a receiver (e.g., a UE) in the system detects for the PSC in a first stage and detects for a sequence of SSCs in a second stage using timing obtained from the PSC detection in the first stage. In yet another aspect, the receiver performs PSC detection using correlation results for the SSCs as channel estimates. This may improve PSC and SSC detection performance. In yet another aspect, the receiver efficiently correlates input samples with PSC using a correlator having multiple cascaded stages.

Various aspects and features of the disclosure are described in further detail

BRIEF DESCRIPTION OF THE DRAWINGS

FIGS. 12 and 13 show a process and an apparatus for the Node B.

FIGS. 14 and 15 show a process and an apparatus for the UE.

DETAILED DESCRIPTION

Figure 1:
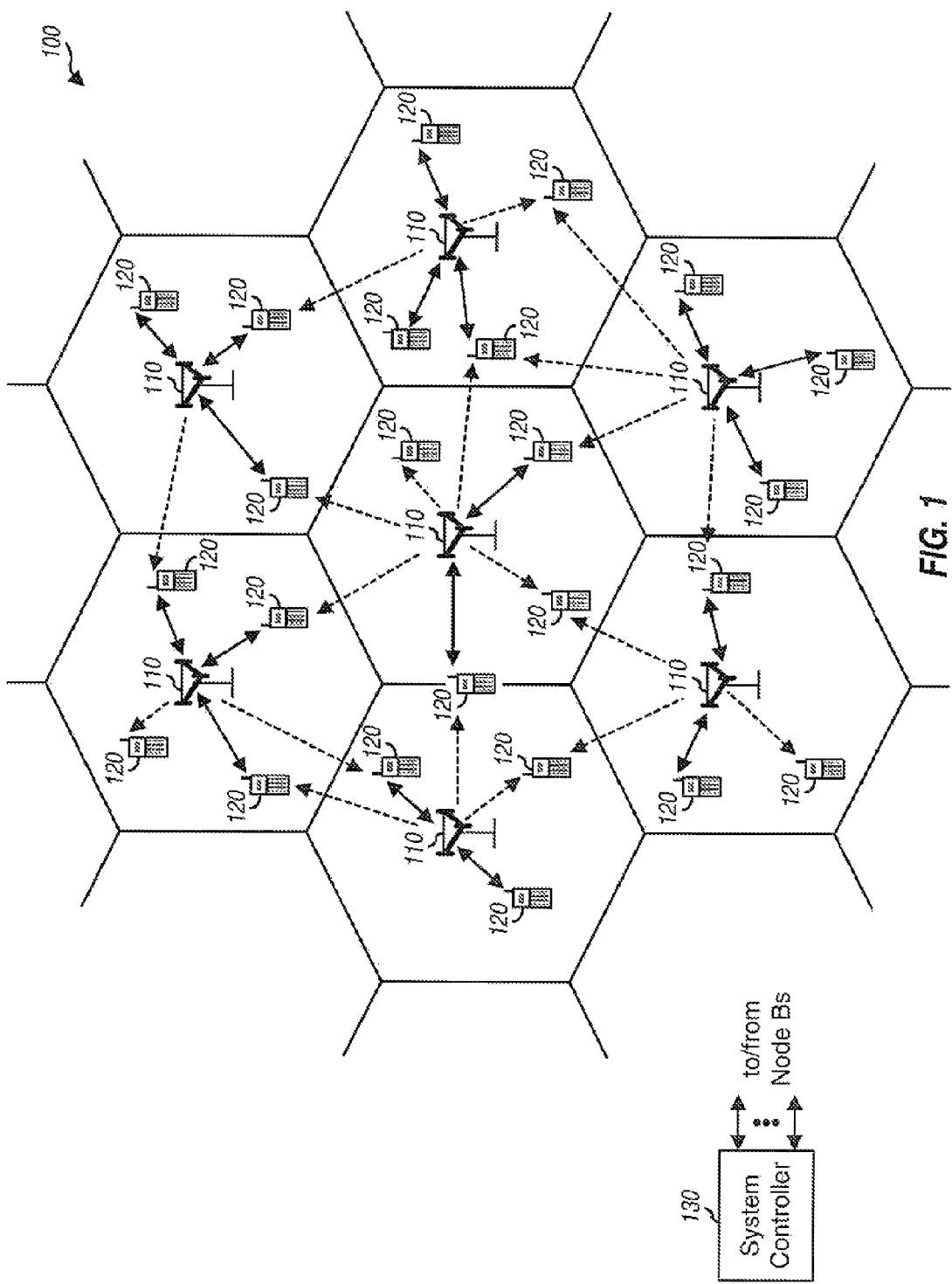
FIG. 1 shows a wireless communication system.

FIG. 1 shows a wireless communication system 100 with multiple Node Bs 110. A Node B is generally a fixed station that communicates with the UEs and may also be referred to as a base station, an enhanced Node B (eNode B), an access point, etc. Each Node B 110 provides communication coverage for a particular geographic area. The term "cell" can refer to a Node B and/or its coverage area depending on the context in which the term is used. To improve system capacity, a Node B coverage area may be partitioned into multiple smaller areas, e.g., three smaller areas. Each smaller area may be served by a respective base transceiver subsystem (BTS). The term "sector" can refer to a BTS and/or its coverage area depending on the context in which the term is used. For a sectorized cell, the BTSs for all sectors of that cell are typically co-located within the Node B for the cell.

UEs 120 may be dispersed throughout the system. A UE may be stationary or mobile and may also be referred to as a mobile station, a mobile equipment, a terminal, an access terminal, a station, etc. A UE may be a cellular phone, a personal digital assistant (PDA), a wireless modem, a wireless communication device, a handheld device, a subscriber unit, etc. A UE may communicate with one or more Node Bs via transmissions on the downlink and uplink. The downlink (or forward link) refers to the communication link from the Node Bs to the UEs, and the uplink (or reverse link) refers to the communication link from the UEs to the Node Bs. In FIG. 1, a solid line with double arrows indicates communication between a Node B and a UE.

A broken line with a single arrow indicates a UE receiving a downlink signal from a Node B. The UE may perform synchronization based on the downlink signal.

A system controller 130 may couple to Node Bs 110 and provide coordination and control for these Node Bs. System controller 130 may be a single network entity or a collection of network entities. System controller 130 may comprise a Radio Network Controller (RNC), a Mobile Switching Center (MSC), etc.

The synchronization techniques described herein may be used for various communication systems such as CDMA, FDMA, TDMA, OFDMA, and SC-FDMA systems. The terms "systems" and "networks" are often used interchangeably. A CDMA system may utilize a radio technology such cdma2000, Universal Terrestrial Radio Access (UTRA) Frequency Division Duplex (FDD), etc. cdma2000 covers IS-2000, IS-95 and IS-8.56 standards. UTRA FDD includes a 3.84 megachips/second (Mcps) Option commonly referred to as Wideband-CDMA (W-CDMA) and a 960 kilochips/second (Kcps) Option referred to as Low Chip Rate (LCR). A TDMA system may utilize a radio technology such as Global System for Mobile Communications (GSM). An OFDMA system utilizes Orthogonal Frequency Division Multiplexing (OFDM) and sends modulation symbols in the frequency domain on orthogonal subcarriers. An OFDMA system may utilize a radio technology such Long Term Evolution (LTE), Flash-OFDM®, etc. An SC-FDMA system utilizes Single-Carrier Frequency Division Multiplexing (SC-FDM) and sends modulation symbols in the time domain on orthogonal subcarriers. The subcarriers may also be referred to as tones, bins, etc. UTRA FDD, GSM and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, the techniques are described below for UTRA FDD LCR, and 3GPP terminology is used in much of the description below.

Figure 2:
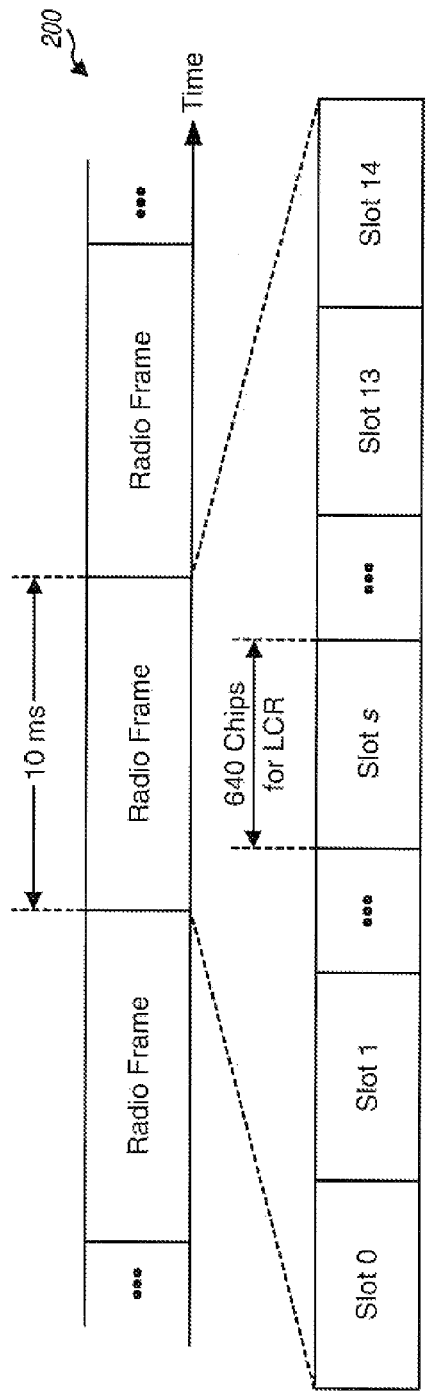
FIG. 2 shows an example frame structure.

FIG. 2 shows a frame structure 200 in UTRA FDD. The timeline for transmission on the downlink is divided into radio frames. Each radio frame has a duration of 10 milliseconds (ms) and is identified by a 12-bit system frame number (SFN) that is transmitted on a control channel. Each radio frame is partitioned into 15 slots, which are labeled as slot 0 through slot 14, and each slot has a duration of 0.667 ms. For LCR, each slot includes 640 chips, and each chip has a duration of 1.041 microseconds (μs). For W-CDMA, each slot includes 2560 chips.

Figure 3:
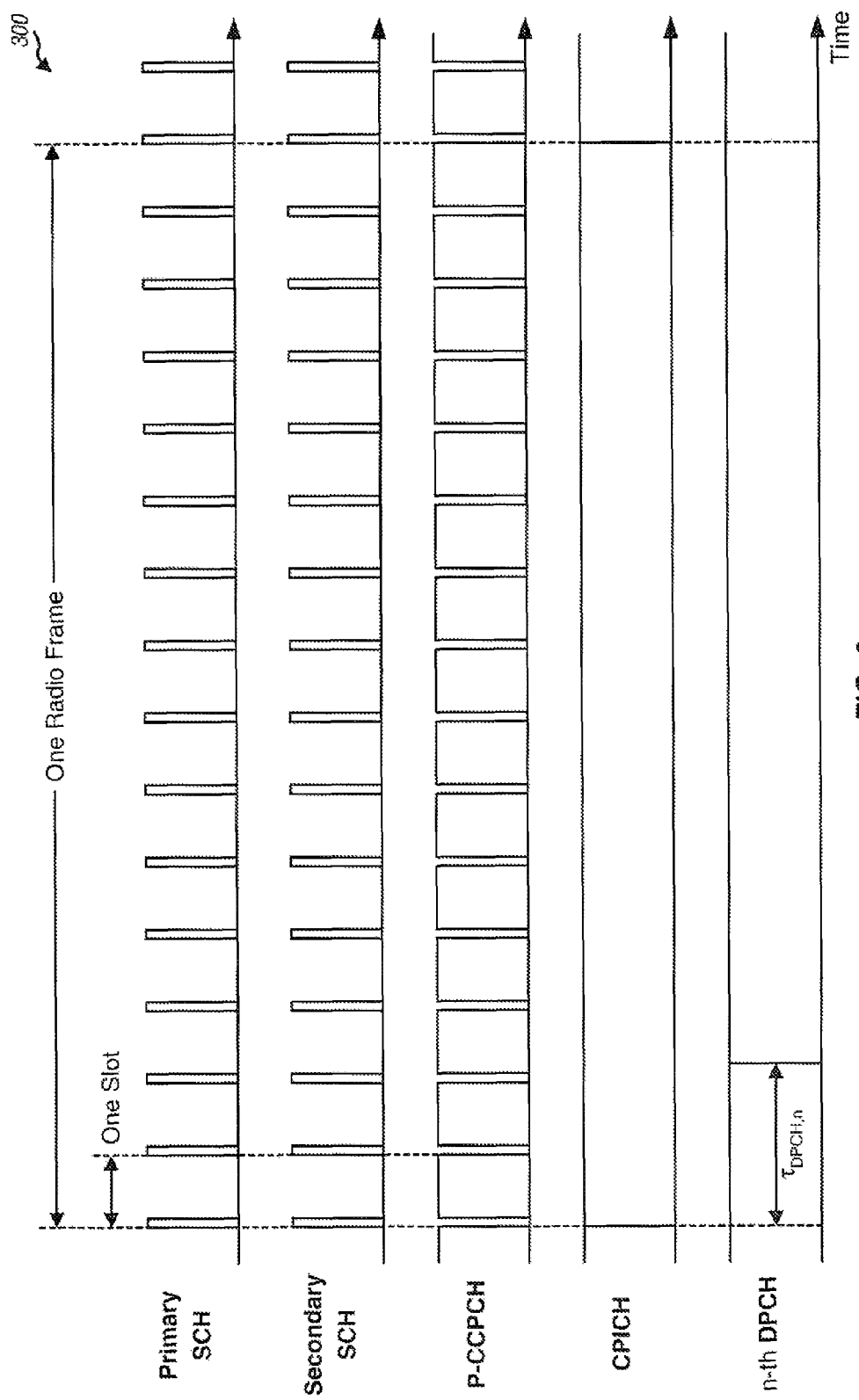
FIG. 3 shows an example channel structure.

FIG. 3 shows a channel structure 300 for the downlink in UTRA FDD. For clarity, FIG. 3 shows only some of the physical channels used in UTRA FDD. A primary synchronization channel (SCH) and a secondary SCH are sent in parallel at the start of each slot without any scrambling code and are used by the UEs for synchronization, e.g., to detect for Node Bs and to acquire timing. The primary SCH and secondary SCH may be considered as subchannels of the SCH.

A primary common control physical channel (CCPH) carries a broadcast channel that conveys system information and other types of information. The primary CCPCH and SCH are time division multiplexed (TDM) so that the SCH is sent during the first part of each slot and the primary CCPCH is sent during the remaining part of each slot. A common pilot channel (CPICH) carries a predefined bit sequence that may be used for channel estimation and other purposes. A downlink dedicated physical channel (DPCH) carries traffic data and signaling for a specific UE. Other physical channels are not shown in FIG. 3 for simplicity.

Figure 4:
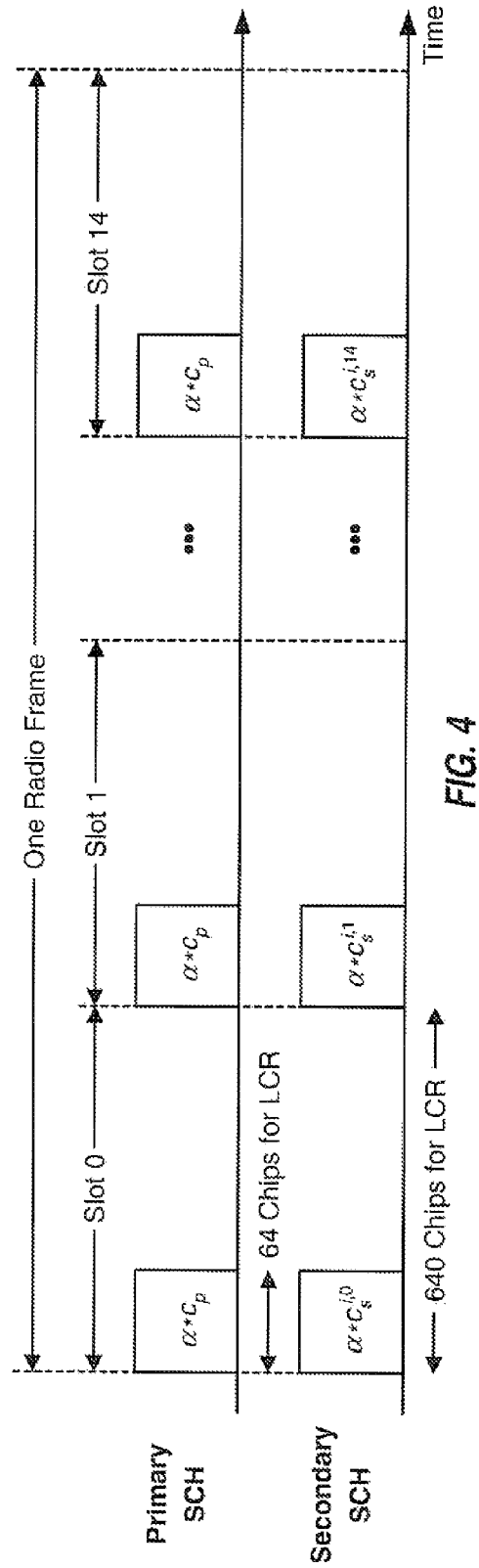
FIG. 4 shows a primary synchronization channel (SCH) and a secondary SCH.

FIG. 4 shows transmission of the primary SCH and secondary SCH in accordance with one design for UTRA FDD LCR. In this design, the primary SCH is sent in the first ten percent of each slot, which is 64 chips for LCR. A primary synchronization code (PSC) is transmitted once every slot on the primary SCH and is denoted as $c_p$ in FIG. 4. In one design, the PSC is a modulated code of length 64 chips and may be generated as described below. In general, the PSC may be an L-chip modulated code, where L may be any value less than 256. The same PSC may be used by every cell/Node B in the system.

In the design shown in FIG. 4, the secondary SCH is also sent in the first ten percent of each slot and in parallel with the primary SCH. A specific sequence of 15 secondary synchronization codes (SSCs) is transmitted on the secondary SCH in 15 slots of each radio frame and is denoted as $c_s^{i,0}$ through $c_s^{i,14}$ in FIG. 4, where i is an index for scrambling code group. In one design, each SSC is a modulation code of length 64 chips and may be generated as described below. In general, each SSC may be an L-chip modulated code. Multiple (e.g., 64) SSC sequences may be defined as also described below. Each Node B may be assigned a specific SSC sequence and may then transmit this SSC sequence in each frame.

The PSC and SSCs may each be multiplied by a factor α that may be dependent on how the primary CCPCH is transmitted. In one design, α=1 if the primary CCPCH is transmitted from two antennas with space-time transmit diversity (STTD), and α=−1 if the primary CCPCH is transmitted from only one antenna without STTD.

The PSC and SSCs may be designed to achieve (a) good aperiodic correlation properties for the PSC, (b) low correlation between the PSC and SSCs, (c) low correlation between different SSCs for high Doppler spread, (d) reduced search time by the UEs, (e) efficient implementation and simplified detection by the UEs, and/or (f) other goals and considerations.

In one design, the PSC is generated as follows. A 4-chip inner sequence a may be defined as follows:

$$a=<x_1, x_2, x_3, x_4>=<1, 1, 1, -1>. \quad\quad\quad \text{Eq}(1)$$

In general, $x_1$, $x_2$, $x_3$ and $x_4$ may each be a value of either 1 or −1. An inner sequence of a=<−1, −1, −1, 1> may also be used and may achieve similar performance as the inner sequence shown in equation (1). Other inner sequences of the same or different length may also be used for the PSC.

The PSC may be defined as follows:

$$C_{psc}=(1+j)*<a, a, a, -a, -a, a, -a, -a, a, a, a, -a,\\ a, -a, a, a>, \quad\quad\quad \text{Eq}(2)$$

where $C_{psc}$ is a 64-chip modulated code for the PSC. The sequence of a and −a may be referred to as an outer sequence u. The leftmost chip in $C_{psc}$ may be sent first in time.

In general, the PSC may be generated as follows:

$$C_{psc}(i)=(1+j)\times a(i\bmod N)*u(i\operatorname{div}N), \text{ for } i=0,\ldots,L-1, \quad \text{Eq}(3)$$

where a(imodN) denotes the (imodN)-th element of inner sequence a,
u(idivN) denotes the (idivN)-th element of outer sequence u,
N is the length of the inner sequence, and L is the length of the PSC.

Inner sequence a may be a generalized hierarchical sequence, e.g., as shown in equation (1). Outer sequence u may be a Golay sequence shown within < > in equation (2). Each element of outer sequence u is substituted by inner sequence a. The inner and outer sequences may also be referred to as constituent sequences, etc. The total length L of the PSC may be achieved with different sequence sizes. For example, a 64-chip PSC may be achieved with (a) a 4-chip inner sequence and a 16-chip outer sequence, as shown in equations (1) and (2), (b) an 8-chip inner sequence and an 8-chip outer sequences, (c) a 16-chip inner sequence and a 4-chip outer sequence, etc.

In one design, the SSCs are generated as follows. A 4-chip inner sequence b may be defined as follows:

$$b=<x_1, x_2, -x_3, -x_4>=<1, 1, -1, 1>. \qquad \text{Eq(4)}$$

Inner sequence b may be defined based on elements of inner sequence a, e.g., as shown in equation (4). The SSCs would then be orthogonal to the PSC over some minimum length, e.g., 16 chips.

A full sequence z may be defined with inner sequence b, as follows:

$$z=<b, b, b, -b, b, b, -b, -b, b, -b, b, -b, -b, -b, -b, -b>. \qquad \text{Eq(5)}$$

In general, the full sequence may be generated as follows:

$$z(i)=b(i\bmod N)*v(i\operatorname{div} N), \text{ for } i=0,\ldots,L-1, \qquad \text{Eq(6)}$$

where $b(i\bmod N)$ denotes the $(i\bmod N)$-th element of inner sequence b, and
$v(i\operatorname{div} N)$ denotes the $(i\operatorname{div} N)$-th element of an outer sequence v.

Inner sequence b may be a generalized hierarchical sequence, e.g., as shown in equation (4). Outer sequence v may be a Golay sequence composed of b and −b within < > in equation (5). Each element of outer sequence v is substituted by inner sequence b. The total length L of the SSC may be achieved with different sequence sizes. For example, a 64-chip SSC may be achieved with (a) a 4-chip inner sequence and a 16-chip outer sequence, as shown in equations (4) and (5), (b) an 8-chip inner sequence and an 8-chip outer sequence, (c) a 16-chip inner sequence and a 4-chip outer sequence, etc.

A 64×64 Hadamard matrix $H_6$ may be recursively formed as follows:

$$H_1 = \begin{bmatrix} 1 & 1 \\ 1 & -1 \end{bmatrix} \text{ and} \qquad \text{Eq (7)}$$

$$H_\ell = \begin{bmatrix} H_{\ell-1} & H_{\ell-1} \\ H_{\ell-1} & -H_{\ell-1} \end{bmatrix} \text{ for } \ell > 1,$$

where $H_1$ is a 2×2 Hadamard matrix and $H_l$ is a $2^l \times 2^l$ Hadamard matrix. The rows of $H_l$ are numbered from the top starting with row 0, which contains all ones.

In one design, 16 SSCs may be defined based on the full sequence z and the $H_6$ Hadamard matrix. The k-th SSC, for k=1, 2, . . . , 16, may be defined as follows:

$$C_{ssc,k}=(1+j)*<h_m(0)\cdot z(0), h_m(1)\cdot z(1), h_m(2)\cdot z_m(2), \ldots, h_m(63)\cdot z(63)>, \qquad \text{Eq(8)}$$

where $C_{ssc,k}$ is the k-th SSC,
$m=4\cdot(k-1)$ is the row of the $H_6$ Hadamard matrix used to generate $C_{ssc,k}$,
$h_m(i)$ is the i-th element in the m-th row of the $H_6$ Hadamard matrix, and
z(i) is the i-th element of full sequence z.

16 SSCs $C_{ssc,1}$ through $C_{ssc,16}$ may be generated with 16 different rows of the $H_6$ Hadamard matrix (or every fourth row of $H_6$) and the same full sequence z.

In one design, 64 SSC sequences may be defined with the 16 SSCs. Each SSC sequence contains 15 SSCs arranged in a specific order and is associated with one scrambling code group. Table 1 gives the 64 SSC sequences for 64 scrambling code groups in accordance with one design. The second through last columns of Table 1 give the indices of the SSCs used for different slots of a radio frame for each SSC sequence. For example, an entry of "3" corresponds to $C_{ssc,3}$. The SSC sequence for group 0 includes $C_{ssc,1}$, $C_{ssc,1}$, $C_{ssc,2}$, $C_{ssc,8}$, . . . , $C_{ssc,16}$, which are transmitted in slots 0, 1, 2, 3, . . . , 14, respectively, of each radio frame. The SSC sequences for other groups may be obtained in similar manner from Table 1. Each SSC sequence has a total length of 960 chips, or 15 slots time 64 chips/slot.

TABLE 1

| Scrambling Code Group | Slot Number | | | | | | | | | | | | | | |
|---|---|---|---|---|---|---|---|---|---|---|---|---|---|---|---|
| | #0 | #1 | #2 | #3 | #4 | #5 | #6 | #7 | #8 | #9 | #10 | #11 | #12 | #13 | #14 |
| Group 0 | 1 | 1 | 2 | 8 | 9 | 10 | 15 | 8 | 10 | 16 | 2 | 7 | 15 | 7 | 16 |
| Group 1 | 1 | 1 | 5 | 16 | 7 | 3 | 14 | 16 | 3 | 10 | 5 | 12 | 14 | 12 | 10 |
| Group 2 | 1 | 2 | 1 | 15 | 5 | 5 | 12 | 16 | 6 | 11 | 2 | 16 | 11 | 15 | 12 |
| Group 3 | 1 | 2 | 3 | 1 | 8 | 6 | 5 | 2 | 5 | 8 | 4 | 4 | 6 | 3 | 7 |
| Group 4 | 1 | 2 | 16 | 6 | 6 | 11 | 15 | 5 | 12 | 1 | 15 | 12 | 16 | 11 | 2 |
| Group 5 | 1 | 3 | 4 | 7 | 4 | 1 | 5 | 5 | 3 | 6 | 2 | 8 | 7 | 6 | 8 |
| Group 6 | 1 | 4 | 11 | 3 | 4 | 10 | 9 | 2 | 11 | 2 | 10 | 12 | 12 | 9 | 3 |
| Group 7 | 1 | 5 | 6 | 6 | 14 | 9 | 10 | 2 | 13 | 9 | 2 | 5 | 14 | 1 | 13 |
| Group 8 | 1 | 6 | 10 | 10 | 4 | 11 | 7 | 13 | 16 | 11 | 13 | 6 | 4 | 1 | 16 |
| Group 9 | 1 | 6 | 13 | 2 | 14 | 2 | 6 | 5 | 5 | 13 | 10 | 9 | 1 | 14 | 10 |
| Group 10 | 1 | 7 | 8 | 5 | 7 | 2 | 4 | 3 | 8 | 3 | 2 | 6 | 6 | 4 | 5 |
| Group 11 | 1 | 7 | 10 | 9 | 16 | 7 | 9 | 15 | 1 | 8 | 16 | 8 | 15 | 2 | 2 |
| Group 12 | 1 | 8 | 12 | 9 | 9 | 4 | 13 | 16 | 5 | 1 | 13 | 5 | 12 | 4 | 8 |
| Group 13 | 1 | 8 | 14 | 10 | 14 | 1 | 15 | 15 | 8 | 5 | 11 | 4 | 10 | 5 | 4 |
| Group 14 | 1 | 9 | 2 | 15 | 15 | 16 | 10 | 7 | 8 | 1 | 10 | 8 | 2 | 16 | 9 |
| Group 15 | 1 | 9 | 15 | 6 | 16 | 2 | 13 | 14 | 10 | 11 | 7 | 4 | 5 | 12 | 3 |
| Group 16 | 1 | 10 | 9 | 11 | 15 | 7 | 6 | 4 | 16 | 5 | 2 | 12 | 13 | 3 | 14 |
| Group 17 | 1 | 11 | 14 | 4 | 13 | 2 | 9 | 10 | 12 | 16 | 8 | 5 | 3 | 15 | 6 |
| Group 18 | 1 | 12 | 12 | 13 | 14 | 7 | 2 | 8 | 14 | 2 | 1 | 13 | 11 | 8 | 11 |
| Group 19 | 1 | 12 | 15 | 5 | 4 | 14 | 3 | 16 | 7 | 8 | 6 | 2 | 10 | 11 | 13 |
| Group 20 | 1 | 15 | 4 | 3 | 7 | 6 | 10 | 13 | 12 | 5 | 14 | 16 | 8 | 2 | 11 |
| Group 21 | 1 | 16 | 3 | 12 | 11 | 9 | 13 | 5 | 8 | 2 | 14 | 7 | 4 | 10 | 15 |
| Group 22 | 2 | 2 | 5 | 10 | 16 | 11 | 3 | 10 | 11 | 8 | 5 | 13 | 3 | 13 | 8 |
| Group 23 | 2 | 2 | 12 | 3 | 15 | 5 | 8 | 3 | 5 | 14 | 12 | 9 | 8 | 9 | 14 |
| Group 24 | 2 | 3 | 6 | 16 | 12 | 16 | 3 | 13 | 13 | 6 | 7 | 9 | 2 | 12 | 7 |
| Group 25 | 2 | 3 | 8 | 2 | 9 | 15 | 14 | 3 | 14 | 9 | 5 | 5 | 15 | 8 | 12 |
| Group 26 | 2 | 4 | 7 | 9 | 5 | 4 | 9 | 11 | 2 | 14 | 5 | 14 | 11 | 16 | 16 |

TABLE 1-continued

| Scrambling Code Group | #0 | #1 | #2 | #3 | #4 | #5 | #6 | #7 | #8 | #9 | #10 | #11 | #12 | #13 | #14 |
|---|---|---|---|---|---|---|---|---|---|---|---|---|---|---|---|
| Group 27 | 2 | 4 | 13 | 12 | 12 | 7 | 15 | 10 | 5 | 2 | 15 | 5 | 13 | 7 | 4 |
| Group 28 | 2 | 5 | 9 | 9 | 3 | 12 | 8 | 14 | 15 | 12 | 14 | 5 | 3 | 2 | 15 |
| Group 29 | 2 | 5 | 11 | 7 | 2 | 11 | 9 | 4 | 16 | 7 | 16 | 9 | 14 | 14 | 4 |
| Group 30 | 2 | 6 | 2 | 13 | 3 | 3 | 12 | 9 | 7 | 16 | 6 | 9 | 16 | 13 | 12 |
| Group 31 | 2 | 6 | 9 | 7 | 7 | 16 | 13 | 3 | 12 | 2 | 13 | 12 | 9 | 16 | 6 |
| Group 32 | 2 | 7 | 12 | 15 | 2 | 12 | 4 | 10 | 13 | 15 | 13 | 4 | 5 | 5 | 10 |
| Group 33 | 2 | 7 | 14 | 16 | 5 | 9 | 2 | 9 | 16 | 11 | 11 | 5 | 7 | 4 | 14 |
| Group 34 | 2 | 8 | 5 | 12 | 5 | 2 | 14 | 14 | 8 | 15 | 3 | 9 | 12 | 15 | 9 |
| Group 35 | 2 | 9 | 13 | 4 | 2 | 13 | 8 | 11 | 6 | 4 | 6 | 8 | 15 | 15 | 11 |
| Group 36 | 2 | 10 | 3 | 2 | 13 | 16 | 8 | 10 | 8 | 13 | 11 | 11 | 16 | 3 | 5 |
| Group 37 | 2 | 11 | 15 | 3 | 11 | 6 | 14 | 10 | 15 | 10 | 6 | 7 | 7 | 14 | 3 |
| Group 38 | 2 | 16 | 4 | 5 | 16 | 14 | 7 | 11 | 4 | 11 | 14 | 9 | 9 | 7 | 5 |
| Group 39 | 3 | 3 | 4 | 6 | 11 | 12 | 13 | 6 | 12 | 14 | 4 | 5 | 13 | 5 | 14 |
| Group 40 | 3 | 3 | 6 | 5 | 16 | 9 | 15 | 5 | 9 | 10 | 6 | 4 | 15 | 4 | 10 |
| Group 41 | 3 | 4 | 5 | 14 | 4 | 6 | 12 | 13 | 5 | 13 | 6 | 11 | 11 | 12 | 14 |
| Group 42 | 3 | 4 | 9 | 16 | 10 | 4 | 16 | 15 | 3 | 5 | 10 | 5 | 15 | 6 | 6 |
| Group 43 | 3 | 4 | 16 | 10 | 5 | 10 | 4 | 9 | 9 | 16 | 15 | 6 | 3 | 5 | 15 |
| Group 44 | 3 | 5 | 12 | 11 | 14 | 5 | 11 | 13 | 3 | 6 | 14 | 6 | 13 | 4 | 4 |
| Group 45 | 3 | 6 | 4 | 10 | 6 | 5 | 9 | 15 | 4 | 15 | 5 | 16 | 16 | 9 | 10 |
| Group 46 | 3 | 7 | 8 | 8 | 16 | 11 | 12 | 4 | 15 | 11 | 4 | 7 | 16 | 3 | 15 |
| Group 47 | 3 | 7 | 16 | 11 | 4 | 15 | 3 | 15 | 11 | 12 | 12 | 4 | 7 | 8 | 16 |
| Group 48 | 3 | 8 | 7 | 15 | 4 | 8 | 15 | 12 | 3 | 16 | 4 | 16 | 12 | 11 | 11 |
| Group 49 | 3 | 8 | 15 | 4 | 16 | 4 | 8 | 7 | 7 | 15 | 12 | 11 | 3 | 16 | 12 |
| Group 50 | 3 | 10 | 10 | 15 | 16 | 5 | 4 | 6 | 16 | 4 | 3 | 15 | 9 | 6 | 9 |
| Group 51 | 3 | 13 | 11 | 5 | 4 | 12 | 4 | 11 | 6 | 6 | 5 | 3 | 14 | 13 | 12 |
| Group 52 | 3 | 14 | 7 | 9 | 14 | 10 | 13 | 8 | 7 | 8 | 10 | 4 | 4 | 13 | 9 |
| Group 53 | 5 | 5 | 8 | 14 | 16 | 13 | 6 | 14 | 13 | 7 | 8 | 15 | 6 | 15 | 7 |
| Group 54 | 5 | 6 | 11 | 7 | 10 | 8 | 5 | 8 | 7 | 12 | 12 | 10 | 6 | 9 | 11 |
| Group 55 | 5 | 6 | 13 | 8 | 13 | 5 | 7 | 7 | 6 | 16 | 14 | 15 | 8 | 16 | 15 |
| Group 56 | 5 | 7 | 9 | 10 | 7 | 11 | 6 | 12 | 9 | 12 | 11 | 8 | 8 | 6 | 10 |
| Group 57 | 5 | 9 | 6 | 8 | 10 | 9 | 8 | 12 | 5 | 11 | 10 | 11 | 12 | 7 | 7 |
| Group 58 | 5 | 10 | 10 | 12 | 8 | 11 | 9 | 7 | 8 | 9 | 5 | 12 | 6 | 7 | 6 |
| Group 59 | 5 | 10 | 12 | 6 | 5 | 12 | 8 | 9 | 7 | 6 | 7 | 8 | 11 | 11 | 9 |
| Group 60 | 5 | 13 | 15 | 15 | 14 | 8 | 6 | 7 | 16 | 8 | 7 | 13 | 14 | 5 | 16 |
| Group 61 | 9 | 10 | 13 | 10 | 11 | 15 | 15 | 9 | 16 | 12 | 14 | 13 | 16 | 14 | 11 |
| Group 62 | 9 | 11 | 12 | 15 | 12 | 9 | 13 | 13 | 11 | 14 | 10 | 16 | 15 | 14 | 16 |
| Group 63 | 9 | 12 | 10 | 15 | 13 | 14 | 9 | 14 | 15 | 11 | 11 | 13 | 12 | 16 | 10 |

The SSC sequences generated as described above have certain desirable properties. It can be shown that cyclic shifts of the SSC sequences are unique, so that a non-zero cyclic shift of less than 15 for any SSC sequence is not equivalent to some cyclic shift of any other SSC sequence. Also, a non-zero cyclic shift of less than 15 for each SSC sequence is not equivalent to any other cyclic shift of less than 15 for that SSC sequence.

The 64 SSC sequences are associated with 64 scrambling code groups. Each scrambling code group may include e.g., eight scrambling codes that are different from the scrambling codes for all other scrambling code groups. Each Node B may be assigned a specific SSC sequence as well as a specific scrambling code from the group associated with the assigned SSC sequence.

In general, an SSC may be sent in each of M time intervals, where M>1. A time interval may correspond to a slot, a frame, a symbol period, a predetermined number of symbol periods, etc. A set of K different SSCs may be available for each of the M time intervals, where K>1. In each time interval, one SSC may be selected from the associated set of SSCs and sent in that time interval. The same set of SSCs may be used for all M time intervals. Alternatively, different sets of SSCs may be used for different time intervals, For LCR, M is equal to 15, a time interval is one slot, the same set of 16 SSCs is used for each of the 15 slots, and each Node B may be assigned a specific sequence of 15 SSCs for the 15 slots, as described above. For OFDM-based system (e.g., a system utilizing LTE), a time interval may correspond to one or multiple OFDM symbol periods, and the same set of K SSCs may be used for each time interval. if any SSC can be selected for each of the M time intervals, then $K^M$ combinations or sequences of SSCs are available. For example, if M is equal to 2 and each time interval is associated with a set of 16 SSCs, then 256 combinations of SSCs are available, and each Node B may be assigned one SSC combination from among the 256 available SSC combinations.

For an OFDM-based system, the PSC may be sent in one or more OFDM symbol periods, and the SSCs may also be sent in one or more OFDM symbol periods. The PSC and SSCs may each be sent across frequency, e.g., one chip on each subcarrier. In one specific design, the PSC is sent in each of two OFDM symbol periods, and two SSCs are sent in two OFDM symbol periods. The PSC may comprise 64 chips that may be sent on 64 subcarriers in each OFDM symbol period. Each SSC may comprise 64 chips that may also be sent on 64 subcarriers in one OFDM symbol period. The PSC and SSCs may also be sent in different manners, e.g., in different number of OFDM symbol periods, on different number of subcarriers, etc.

Figure 5:
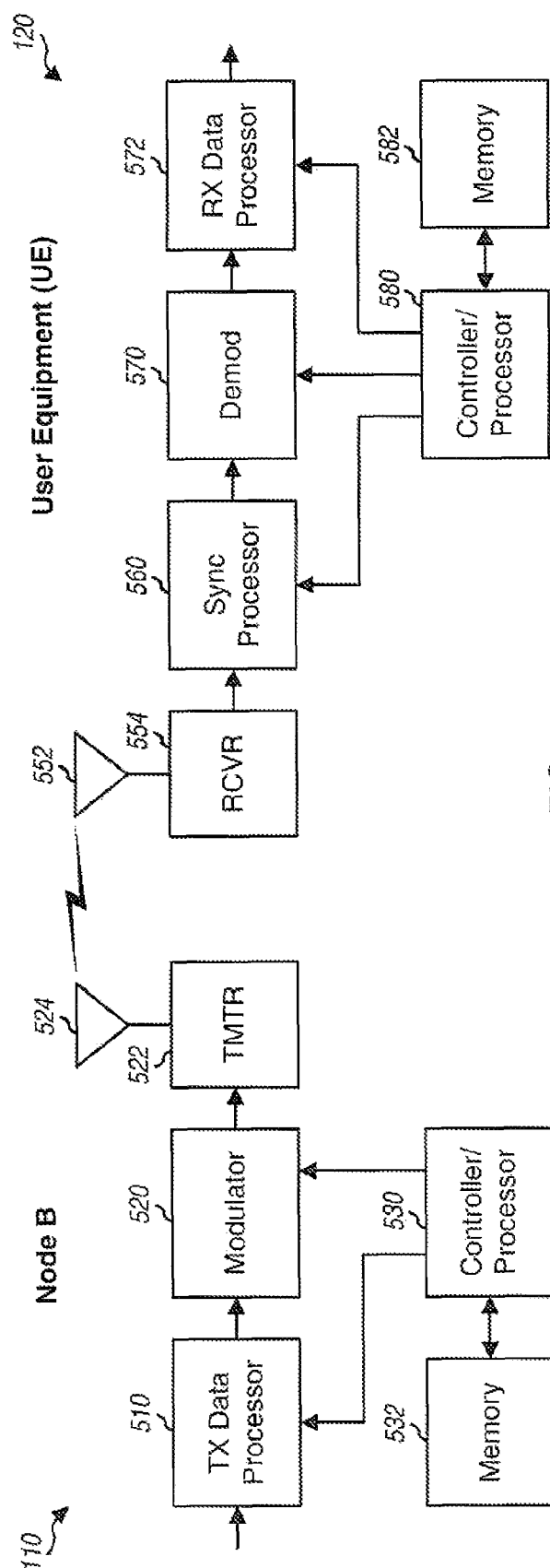
FIG. 5 shows a block diagram of a Node B and a UE.

FIG. 5 shows a block diagram of a Node B 110 and a UE 120, which are one of the Node Bs and UEs in FIG. 1. At Node B 110, a transmit (TX) data processor 510 processes (e.g., encodes, interleaves, and symbol maps) traffic data and generates data symbols. Processor 510 also generates signaling symbols for control channels (e.g., the SCH and CCPCH) and pilot symbols for pilot channel (e.g., the CPICH). A modulator 520 processes the data, signaling and pilot symbols as specified by the system and provides output chips. Modulator 520 may perform modulation for CDMA, OFDM, etc. A transmitter (TMTR) 522 processes (e.g., converts to analog, amplifies, filters, and frequency upconverts) the output chips and generates a downlink signal, which is transmitted from an antenna 524.

At UE 120, an antenna 552 receives downlink signals from Node B 110 and other Node Bs and provides a received signal. A receiver (RCVR) 554 conditions (e.g., filters, amplifies, frequency downconverts, and digitizes) the received signal and provides input samples at a sample rate that may be one or multiple times the chip rate, e.g., twice the chip rate or Chip×2. A synchronization (Sync) processor 560 performs synchronization based on the input samples and provides detected Node Bs and their timing. A demodulator (Demod) 570 processes the input samples based on information from sync processor 560 and also in a manner complementary to the processing by modulator 520 to obtain symbol estimates. A receive (RX) data processor 572 processes (e.g. symbol dempas, deinterleaves, and decodes) the symbol estimates and provides decoded data and signaling. In general, the processing by demodulator 570 and RX data processor 572 is complementary to the processing by modulator 520 and TX data processor 510, respectively, at Node B 110.

Controllers/processors 530 and 580 direct the operation of various processing units at Node B 110 and UE 120, respectively. Memories 532 and 582 store data and program codes for Node B 110 and UE 120, respectively.

Figure 6:
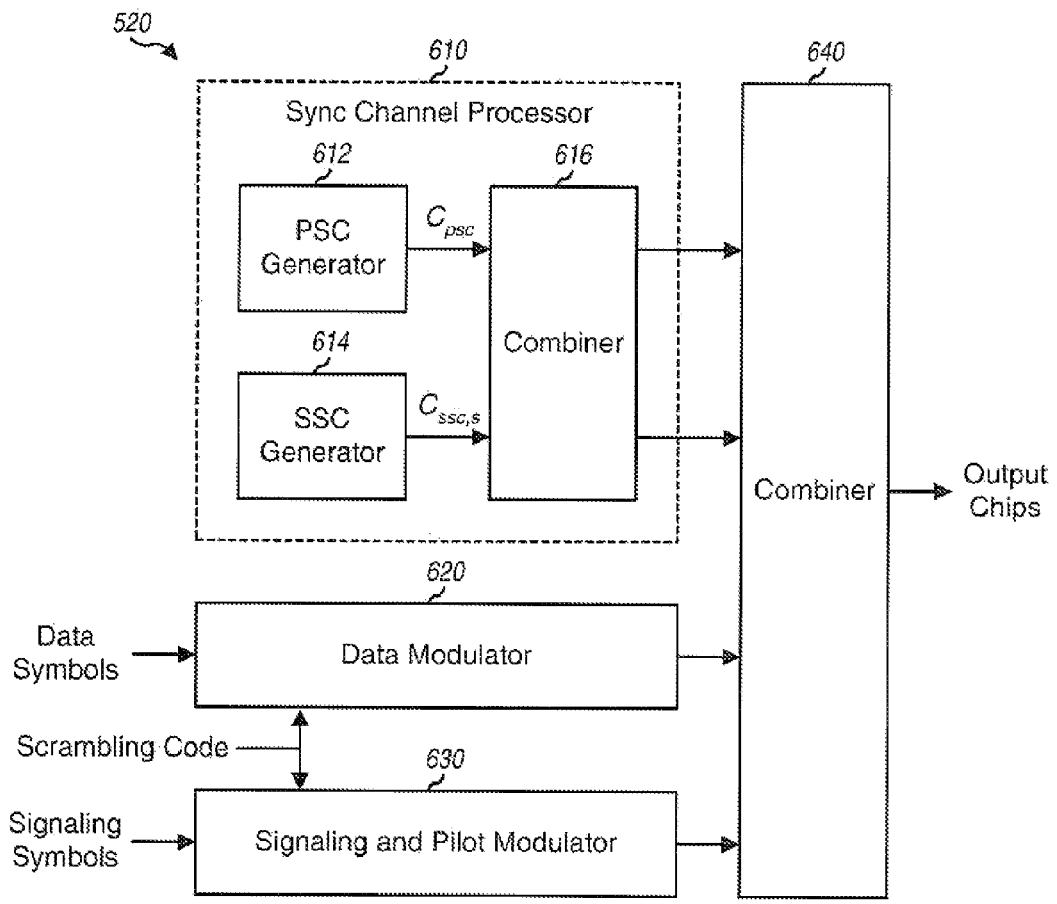
FIG. 6 shows a block diagram of a modulator at the Node B.

FIG. 6 shows a block diagram of a design of modulator 520 at Node B 110. In this design, modulator 520 includes a sync channel processor 610, a data modulator 620, and a signaling and pilot modulator 630.

Within sync channel processor 610, a unit 612 generates the PSC based on inner sequence a and outer sequence u, e.g., as shown in equations (1) and (2). Unit 612 provides the PSC in each slot of each radio frame. A unit 614 generates the sequence of SSCs assigned to Node B 110 based on inner sequence b and outer sequence v, e.g., as shown in equations (4), (5) and (8) and Table 1. Unit 614 provides a specific SSC in each slot s of each radio frame, which is denoted as $C_{ssc,s}$. A combiner 616 receives the PSC from unit 612 and the SSCs from unit 614, combines the PSC and SSC for each slot, and provides a synchronization signal. For LCR, combiner 616 may sum the PSC and SSC for each slot. In general, combiner 616 may combine the PSC and SSCs using code division multiplexing (CDM), time division multiplexing (TDM), frequency division multiplexing (FDM), etc. In each slot, the PSC ad SSC are sent in parallel in the same time interval for CDM, e.g., as shown in FIG. 4. The PSC and SSC are sent in different time intervals for TDM, e.g., with the PSC sent first in one time interval followed by the SSC in another time interval. The PSC and SSC are sent on different subcarriers with FDM. The subcarriers may be obtained with OFDM, SC-FDM, etc.

Modulator 620 performs modulation for data symbols as specified by the system. For LCR, modulator 620 may spread the data symbols with data channelization codes to obtain data chips and may further scramble the data chips with a scrambling code assigned to Node B 110. Modulator 630 performs modulation for signaling and pilot symbols as specified by the system. For LCR, modulator 630 may spread the signaling symbols with signaling channelization codes to obtain signaling chips, spread pilot symbols with a pilot channelization code to obtain pilot chip, combine the signaling and pilot chips, and further scramble the combined chips with the scrambling code assigned to Node B 110. A combiner 640 receives and combines the outputs of Units 610, 620 and 630 as specified by the system and provides output chips. For LCR, combiner 640 may sum the outputs of units 610, 620 and 630 to obtain the output chips.

Units 610, 620, 630 and 640 may process the data, signaling, and pilot symbols in other manners for the systems. As an example, for LTE and other OFDM-based systems, units 610, 620 and 630 may map symbols to subcarriers and symbol periods used for synchronization, traffic data signaling, and pilot. Combiner 640 may then perform OFDM modulation on the outputs of units 610, 620 and 630 and provide output chips.

Figure 7:
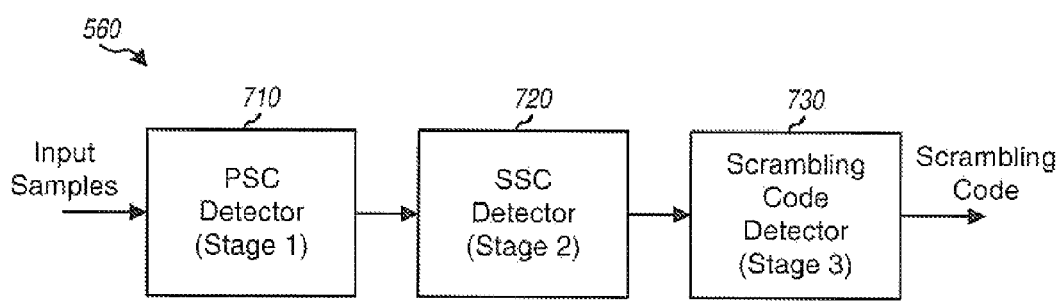
FIG. 7 shows a block diagram of a sync processor at the UE.

FIG. 7 shows a block diagram of a design of sync processor 560 at UE 120. In this design, sync processor 560 includes a PSC detector 710, an SSC detector 720, and a scrambling code detector 730 for stages 1, 2 and 3, respectively, of a synchronization procedure.

In stage 1, PSC detector 710 detects for the presence of the PSC from any Node B. If all Node Bs transmit the same PSC, then detector 710 can scan across time to search for the PSC. Detector 710 provides slot timing indicative of the start of the detected PSC.

In stage 2, SSC detector 720 detects for a sequence of SSCs from a Node B using the slot timing from PSC detector 710. Detector 720 determines the SSC sequence that is most likely to have been transmitted based on the detected SSC sequence. Detector 720 provides the scrambling code group for the most likely SSC sequence and frame timing indicative of the start of this SSC sequence.

In stage 3, detector 730 detects for a scrambling code used by the Node B based on the frame timing and scrambling code group provided by SSC detector 720. Detector 730 may descramble the CPICH with each of the scrambling codes in the scrambling code group and may provide the scrambling code with the largest pilot energy exceeding a pilot threshold. This scrambling code may be used to descramble the downlink signal from the Node B. The processing for stages 1 and 2 is described in further detailed below.

Figure 8:
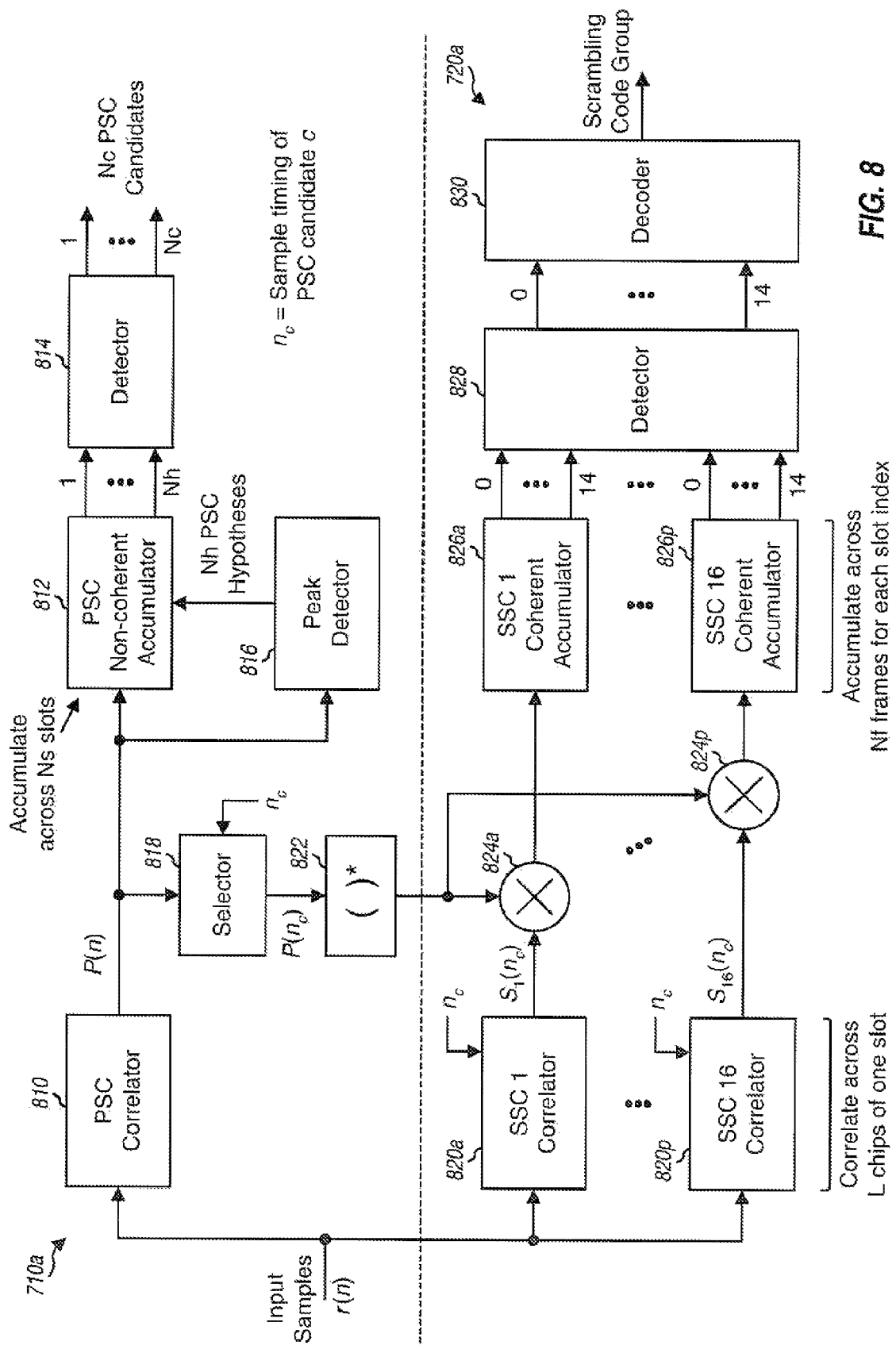
FIG. 8 shows a design of a PSC detector and an SSC detector.

FIG. 8 shows a block diagram of a design of a PSC detector 710a and an SSC detector 720a which may be used for PSC detector 710 and SSC detector 720, respectively, in FIG. 7. Within PSC detector 710a, a PSC correlator 810 performs sliding correlation on the input samples r(n) with the PSC and provides a complex-valued correlation result P(n) for each sample period n. The correlation result for sample period n may be obtained by (a) multiplying input samples in an L-chip window centered at sample period n with the 64 symbols of the modulated code $C_{psc}$ for the PSC and (b) coherently accumulating the results across the 64-chip window to obtain P(n). Coherent accumulation refers to accumulation of complex values whereas non-coherent accumulation refers to accumulation of magnitude or power.

A peak detector 816 receives the correlation results for different sample periods and detects for peak values exceeding a first PSC threshold. Detector 816 provides Nh sample periods where the peak values are detected as Nh PSC hypotheses, where Nh≧1. Each PSC hypothesis corresponds to a specific time instant that the PSC might be present. An accumulator 812 performs non-coherent accumulation of the correlation results across slots for each PSC hypothesis. For a given PSC hypothesis h corresponding to sample period $n_h$, accumulator 812 accumulates the magnitude of the correlation results for sample period $n_h$ across Ns slots and provides an accumulated result for that PSC hypothesis, where Ns>1.

A detector 814 receives the accumulated results for all Nh PSC hypotheses and detects for peak values exceeding a second PSC threshold. Detector 814 provides Nc PSC candidates, where Nh≧Nc≧1. For example, detector 814 may provide one PSC candidate corresponding to the PSC hypothesis with the largest accumulated result, one PSC candidate for each PSC hypothesis with accumulated result exceeding the second PSC threshold, etc. Each PSC candidate corresponds to a specific time instant that the PSC might be present and is indicative of slot timing/boundary.

For clarity, the processing for one PSC candidate is described below. A selector 818 receives the correlation result for each sample period from PSC correlator 810 and, in each slot, passes the correlation result $P(n_c)$ for sample period $n_c$ determined by the PSC candidate. The correlation result $P(n_c)$ for each slot is used as a channel estimate for SSC detection.

Within SSC detector 720a, 16 correlators 820a through 820p perform correlation on input samples r(n) in an L-chip window with 16 different SSCs and provide 16 complex-valued correlation results $S_1(n_c)$ through $S_{16}(n_c)$ for each slot. The L-chip window is centered at sample period $n_c$ determined by the PSC candidate. Each correlator 820 performs correlation in similar manner as correlator 810, albeit with a specific SSC assigned to that correlator instead of the PSC. In each slot, a unit 822 receives the correlation result $P(n_c)$ from selector 818 and provides $P^*(n_c)$ as a channel estimate for that slot, where "*" denotes a complex conjugate. In each slot, 16 multipliers 824a through 824p multiply the correlation results $S_1(n_c)$ through $S_{16}(n_c)$ from correlators 820a through 820p with the channel estimate $P^*(n_c)$. 16 accumulators 826a through 826p perform coherent accumulation of the outputs of multipliers 824a through 824p, respectively, across Nf frames for each slot index, where Nf>1. For example, accumulator 826a accumulates the outputs of multiplier 824a for slot s across Nf frames, accumulates the outputs of multiplier 824a for slot s+1 across Nf frames, etc. Each accumulator 826 provides 15 accumulated results for 15 slot indices. The order of these slot indices is not known since frame timing is not yet available.

A detector 824 obtains 16 accumulated results for the 16 SSCs for each of 15 slot indices, or a total of 240 accumulated results. Detector 828 selects the SSC most likely to have been transmitted for each slot index (e.g., the SSC with the largest accumulated result) and provides a sequence of 15 detected SSCs for 15 slot indices. A decoder 830 receives the detected SSC sequence and determines the SSC sequence most likely to have been transmitted based on the 64 possible SSC sequences shown in Table 1. Decoder 830 provides the scrambling code group for the most likely SSC sequence and frame timing.

In general, if M SSCs are sent in M time intervals, detector 828 may select the SSC most likely to have been transmitted for each of the M time intervals and provide M detected SSCs for the M time intervals. Decoder 830 may receive the detected SSCs and determine the SSC combination or sequence most likely to have been transmitted based on the available SSC combinations or sequences.

If multiple PSC candidates are to be evaluated, then units 818 through 826 perform the processing described above for each PSC candidate. Detector 828 may obtain Nc detected SSC sequences for Nc PSC candidates and provide the best detected SSC sequence, e.g., with the largest energy. Decoder 830 may then determine the most likely SSC sequence based on the best detected SSC sequence.

For an OFDM-based system, received symbols may be obtained for subcarriers used to send the PSC and SSCs. The received symbols may be correlated with the PSC to obtain correlation results for the PSC. If the PSC is sent in multiple OFDM symbol periods, then the correlation results may be accumulated across these multiple OFDM symbol periods. The PSC may be identified based on the accumulated or non-accumulated correlation results. SSC detection may be performed based on the timing provided by the identified PSC. Received symbols for subcarriers in each OFDM symbol period used for each transmitted SSC may be correlated with each of the SSCs that might have been sent in that OFDM symbol period. The most likely SSC may be obtained for each transmitted SSC. A sequence of SSCs may be identified based on the correlation results for the SSCs.

In the design shown in FIG. 8, PSC detection is performed based solely on the PSC. SSC detection is performed using correlation results for the PSC as channel estimates to allow for coherent accumulation by accumulators 826 across frames.

Figure 9:
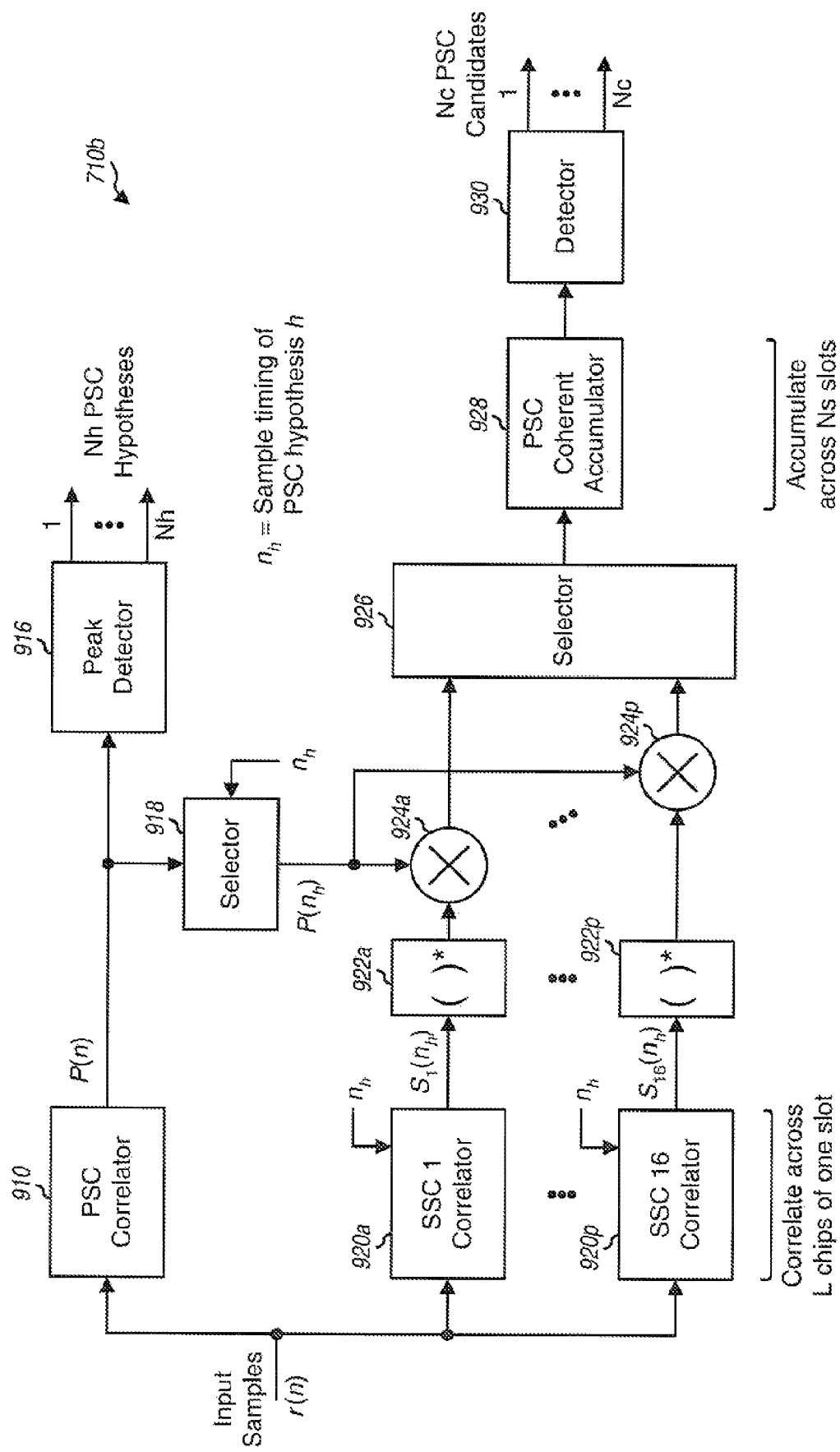
FIG. 9 shows another design of the PSC detector.

FIG. 9 shows a block diagram of a design of a PSC detector 710b, which may also be used for PSC detector 710 in FIG. 7. PSC detector 710b uses correlation results for the SSCs as channel estimates to allow for coherent accumulation of the PSC across slots. This may improve detection performance for the PSC.

Within PSC detector 710b, a PSC correlator 910 and a peak detector 916 operate as described above for PSC correlator 810 and peak detector 816, respectively, in FIG. 8. Detector 916 provides Nh PSC hypotheses. The processing for one PSC hypothesis is described below.

A selector 918 receives the correlation result for each sample period and, in each slot, passes the correlation result $P(n_h)$ for sample period $n_h$ determined by the PSC hypothesis. Correlators 920a through 920p operate as described above for correlators 820a through 820p in FIG. 8, albeit with the L-chip window centered at sample period $n_h$ instead of $n_c$. Correlators 920a through 920p provide correlation results $S_1(n_h)$ through $S_{16}(n_h)$ for the 16 SSCs, which are used as channel estimates for the PSC. Since it is not known which SSC is transmitted in each slot, all 16 SSCs may be evaluated in each slot. In each slot, units 922a through 922p receive the correlation results from correlators 920a through 920p and provide $S_1^*(n_h)$ through $S_{16}^*(n_h)$ as the channel estimates from the 16 SSCs. In each slot, 16 multipliers 924a through 924p multiply the correlation result $P(n_h)$ from selector 918 with the outputs of units 922a through 922p, respectively. In each slot, a selector 926 receives the outputs of multipliers 924a through 924p and provides the best output, e.g., with the largest magnitude. An accumulator 928 performs coherent accumulation of the output of selector 926 across Ns slots. Units 918 through 923 perform the processing described above for each of Nh PSC hypotheses. A detector 930 obtains Nh accumulated results for the Nh PSC hypotheses and provides Nc PSC candidates.

To reduce complexity, selector 926 may be placed after correlators 920a through 920p. In each slot, selector 926 may select the best correlation result from among the 16 correlation results for the 16 SSCs. Only one unit 922 and one multiplier 924 would then operate on the selected SSC correlation result from selector 926.

The use of the SSCs for PSC detection may improve PSC detection performance by reducing false alarm probability (declaring PSC when it is actually not present) and/or improving detection probability (declaring PSC when it is actually present). SSC detection may also benefit from the improved PSC detection. This PSC detection technique may be used for the PSC and SSCs described above as well as for other PSC and SSCs, e.g., the 256-chip PSC and 256-chip SSCs used in W-CDMA and PSC and SSCs for other OFDM-based systems.

PSC correlator 810 in FIG. 8 and PSC correlator 910 in FIG. 9 perform sliding correlation on the input samples for each sample period. The sliding correlation may be efficiently performed by exploiting the recursive nature of the PSC. The PSC in equation (2) may be expressed recursively as follows:

$$a_0(i)=b_0(i)=\delta(i),$$

$$a_m(i)=a_{m-1}(i)+W_m \cdot b_{m-1}(i-D_m), \text{ and}$$

$$b_m(i)=a_{m-1}(i)-W_m \cdot b_{m-1}(-D_m), \quad \text{Eq(9)}$$

where i=0, 1, 2, . . . , 63 is a chip index and m=1, 2, . . . , 6 is a section index, $$\delta(i) \begin{cases} 1 & \text{for } i = 0 \\ 0 & \text{for } i \neq 0 \end{cases},$$

$[W_1, W_2, W_3, W_4, W_5, W_6]=[1, -1, 1, 1, 1, 1]$ are weights for six sections, $[D_1, D_2, D_3, D_4, D_5, D_6]=[32, 16, 4, 8, 1, 2]$ are delays for six sections, and $b_4(i)=a_4(i)$.

Figure 10:
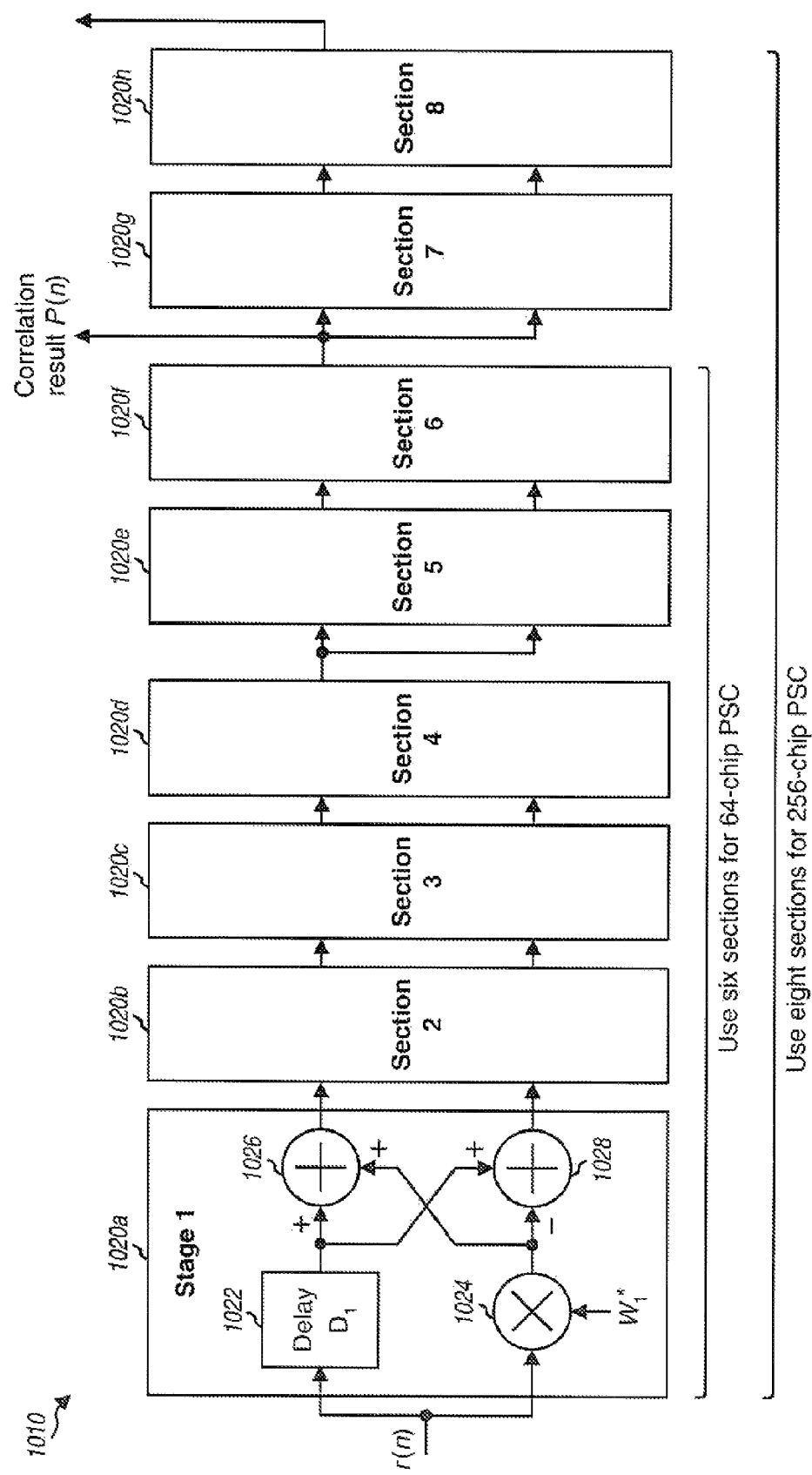
FIG. 10 shows a design of a PSC correlator.

FIG. 10 shows a block diagram of a design of a PSC correlator 1010 that performs sliding correlation for the PSC in a recursive manner complementary to the PSC generation. PSC correlator 1010 may be used for PSC correlator 810 in FIG. 8 and PSC correlator 910 in FIG. 9. PSC correlator 1010 includes eight sections 1020*a* through 1020*h*. Each section m, for m=1, 2, . . . , 8, receives $P_{m-1}(i)$ and $q_{m-1}(i)$ from a prior section and provides $p_m(i)$ and $q_m(i)$ to the next section. The input samples r(n) are provided as $p_0(i)$ and $q_0(i)$ for the first section 1020*a*.

Each section includes a delay unit 1022, a multiplier 1024, and summers 1026 and 1028. For section m, delay unit 1022 receives $p_{m-1}(i)$ from prior section m−1 and provides a delay of $D_m$ chips. Multiplier 1024 receives $q_{m-1}(i)$ from prior section m−1 and multiplies $q_{m-1}(i)$ with weight $W_m^*$. Summer 1026 sums the outputs of delay unit 1022 and multiplier 1024 and provides $p_m(i)$ to the next section. Summer 1028 subtracts the output of multiplier 1024 from the output of delay unit 1022 and provides $q_m(i)$ to the next section.

For the 64-chip PSC shown in equation (2), the first six sections are used. The weights $W_1$ through $W_6$ and the delays $D_1$ through $D_6$ are shown in equation set (9). The output of summer 1026 in the sixth section 1020*f* is provided as the correlation result P(n) for each sample period. After an initial delay of 63 chips, section 1020*f* provides one correlation result for each received sample.

For the 256-chip PSC used for W-CDMA and described in TS 25.213, entitled "Spreading and modulation (FDD)," March 2006, which is publicly available, all eight sections are used. The weights and delays for the eight sections are given as;

$[W_1, W_2, W_3, W_4, W_5, W_6, W_7, W_8]=[1, -1, 1, 1, 1, 1, 1, 1]$, $[D_1, D_2, D_3, D_4, D_5, D_6, D_7, D_8]=[128, 64, 16, 32, 8, 1, 4, 2]$, and $b_m(i)=a_m(i)$ for $m=4$ and 6. $\quad$ Eq(10)

The output of summer 1026 in the eighth section 1020*h* is provided as the correlation result P(n) for each sample period. After an initial delay of 255 chips, section 1020*h* provides one correlation result for each received sample.

The same PSC correlator structure shown in FIG. 10 may be used for PSC detection for both LCR and W-CDMA, albeit with different weights and delays. This may simplify the design of a UE that supports both LCR and W-CDMA.

Figure 11A:
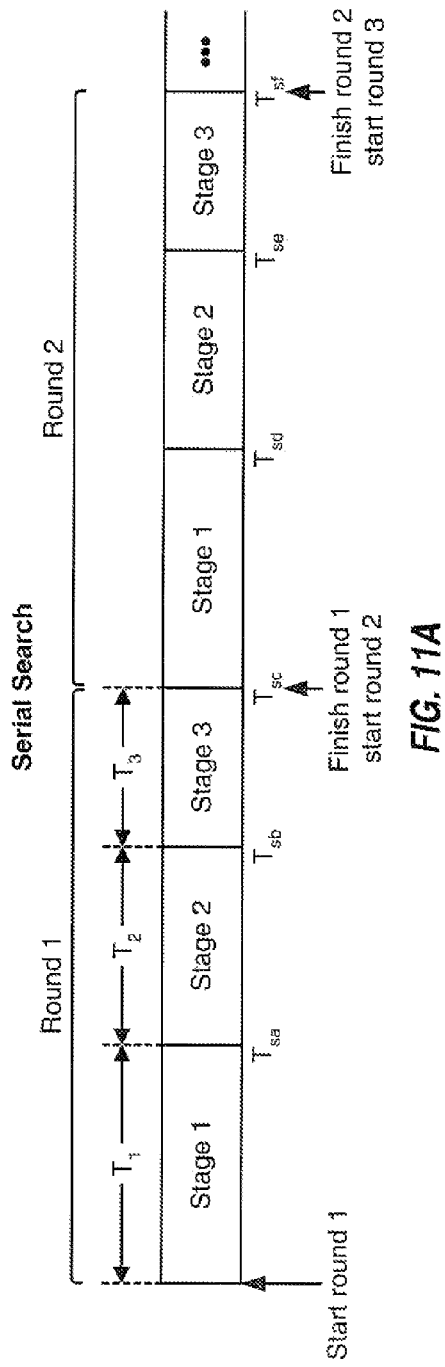
FIGS. 11A and 11B show serial and pipelined search schemes, respectively.

FIG. 11A shows a serial search scheme that performs a new round of processing for stages 1, 2 and 3 after completing a prior round. In the first round, stage 1 performs PSC detection and provides a PSC candidate at time $T_{sa}$. Stage 2 performs SSC detection based on the PSC candidate and provides a scrambling code group at time $T_{sb}$. Stage 3 evaluates different scrambling codes in the scrambling code group and indicates whether a Node B is detected at time $T_{sc}$. Another round may then be performed for another PSC candidate starting at time $T_{sc}$, e.g., if stage 3 in the first round fails, if another Node B is to be detected, etc. Stages 1, 2 and 3 have durations of $T_1$, $T_2$ and $T_3$, respectively, which may be any suitably selected durations, e.g., $T_1$=30 ms, $T_2$=20 ms, and $T_3$=10 ms. The total search time is equal to Nr*60 ms, where Nr is the number of rounds.

Figure 11B:
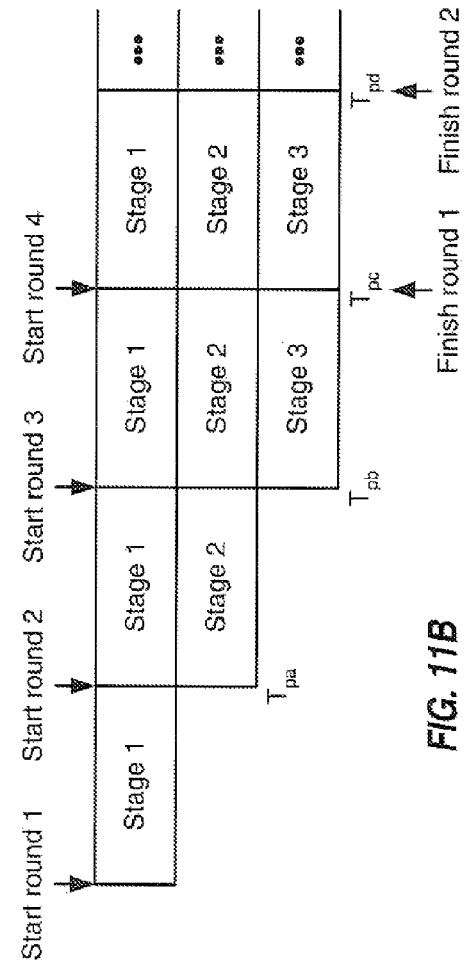

FIG. 11B shows a pipeline search scheme that performs rounds of processing for stages 1, 2 and 3 in a pipelined manner. In the first round, stage 1 performs PSC detection and provides a PSC candidate at time $T_{pa}$. Stage 2 performs SSC detection starting at time $T_{pa}$ and provides a scrambling code group at time $T_{pb}$. While stage 2 performs SSC detection, stage 1 may perform PSC detection for a second PSC candidate. Stage 3 evaluates different scrambling codes starting at time $T_{pb}$ and indicates whether a Node B is detected at time $T_{pc}$. While stage 3 evaluates different scrambling codes, stage 2 may perform SSC detection for the second PSC candidate, and stage 1 may perform PSC detection for a third PSC candidate. Stage 3 may evaluate different scrambling codes for the second PSC candidate starting at time $T_{pc}$, without having to wait for PSC and SSC detection. Stages 1, 2 and 3 have durations of $T_1$, $T_2$ and $T_3$, respectively, which may be any suitably selected durations, e.g., $T_1=T_2=T_3=10$ ms.

If only one PSC candidate is selected in stage 1, then the total search time $T_{ACQ}$ may be given as;

$$T_{ACQ} \approx \frac{T_1}{X+Y+Z} + T_2 + T_3, \quad \text{Eq (11)}$$

where X is the probability of correctly detecting in all three stages,

Y is the probability of choosing an incorrect PSC candidate in the stage 1, and Z is the probability of correctly detecting in stage 1 but incorrectly detecting in stages 2 and 3, which leads to incorrect synchronization.

FIG. 12 shows a process 1200 performed by a transmitter, e.g., a Node B, in a wireless communication system. A PSC having a length of L chips is generated based on a first inner sequence and a first outer sequence, where L is less than 256 (block 1212). A sequence of SSCs is generated based on a second inner sequence and a second outer sequence, with each SSC having a length of L chips (block 1214). In one design, L is equal to 64, the PSC has a length of 64 chips and each SSC has a length of 64 chips. The first inner sequence may be as shown in equation (1), and the first outer sequence may be as shown in equation (2). The second inner sequence may be as shown in equation (4), and the second outer sequence may be as shown in equation (5). Other inner and outer sequences may also be used for the PSC and SSCs, which may be of other lengths beside 64 chips.

The PSC is sent in each of multiple slots of a frame (block 1216). The sequence of SSCs is sent in the multiple slots of the frame, one SSC in each slot (block 1218). The PSC and SSC may be sent in parallel in the same time interval, in different time intervals, or on different subcarriers in each slot. The PSC and the sequence of SSCs may be sent at a chip rate of 960 Kcps or some other chip rate.

FIG. 13 shows an apparatus 1300 for a transmitter. Apparatus 1300 includes means for generating a PSC having a length of L chips based on a first inner sequence and a first outer sequence, where L is less than 256 (block 1312), means for generating a sequence of SSCs based on a second inner sequence and a second outer sequence, with each SSC having a length of L chips (block 1314), means for sending the PSC in each of multiple slots of a frame (block 1316), and means for sending the sequence of SSCs in the multiple slots of the frame, one SSC in each slot (block 1318).

FIG. 14 shows a process 1400 performed by a receiver, e.g., a UE, in a wireless communication system. A PSC having a length of L chips, where L is less than 256, is detected in a first stage (block 1412). A sequence of SSCs, with each SSC having a length of L chips, is detected in a second stage (block 1414). In one design, L is equal to 64, the PSC has a length of 64 chips, and each SSC has a length of 64 chips. In a third stage, a scrambling code is detected from among a group of scrambling codes associated with the sequence of SSCs obtained in the second stage (block 1416).

For PSC detection in the first stage, input samples may be correlated with the PSC (e.g., using PSC correlator 1010 in FIG. 10) to obtain correlation results for multiple sample periods in each of multiple slots. The correlation results may be coherently or non-coherently accumulated across the multiple slots. At least one candidate may be identified for the PSC based on the accumulated correlation results.

For SSC detection in the second stage, the input samples may be correlated with multiple (e.g., 16) SSCs based on the timing for the at least one PSC candidate to obtain correlation results for the multiple SSCs. The correlation results for the multiple SSCs may be accumulated across multiple frames for each of multiple (e.g., 15) slot indices. Coherent accumulation may be performed using the correlation results for the PSC as channel estimates, as shown in FIG. 8. The sequence of SSCs may be identified based on the accumulated correlation results for the multiple SSCs. For example, a detected SSC may be obtained for each slot index based on the accumulated correlation results for the multiple SSCs for that slot index, and the sequence of SSCs may be identified based on the detected SSCs for the multiple slot indices.

FIG. 15 shows an apparatus 1500 for a receiver. Apparatus 1500 includes means for detecting a PSC having a length of L chips, where L is less than 256 (block 1512), means for detecting a sequence of SSCs, with each SSC having a length of L chips (block 1414), and means for detecting a scrambling code from among a group of scrambling codes associated with the sequence of SSCs (block 1516).

Figure 16:
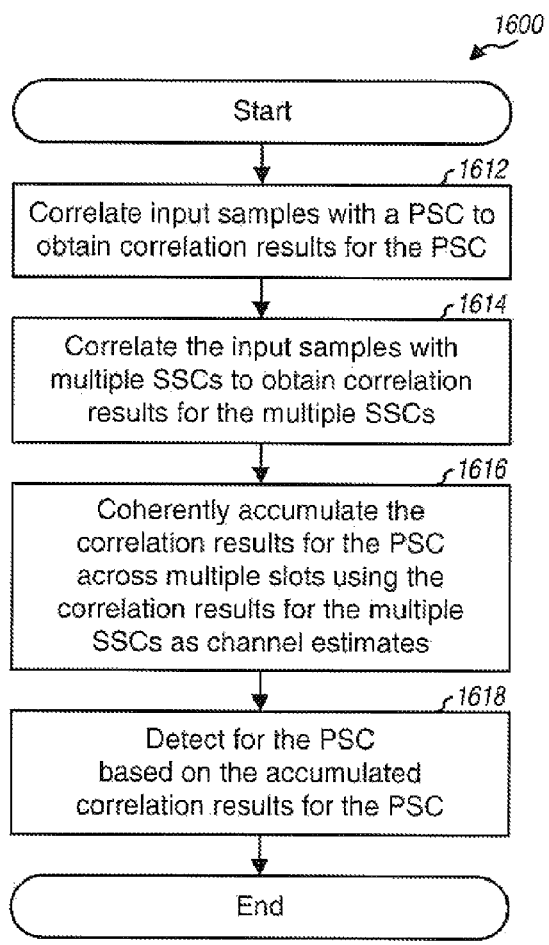
FIGS. 16 and 17 show a process and an apparatus for PSC detection.

FIG. 16 shows a process 1600 performed by a receiver, e.g., a UE for PSC detection. Process 1600 may be used for block 1412 in FIG. 14. Input samples are correlated with a PSC to obtain correlation results for the PSC (block 1612). The input samples are also correlated with multiple (e.g., 16) SSCs to obtain correlation results for the multiple SSCs (block 1614). The correlation results for the PSC are coherently accumulated across multiple slots using the correlation results for the multiple SSCs as channel estimates (block 1616). The PSC is then detected based on the accumulated correlation results for the PSC (block 1618).

For the coherent accumulation in block 1616, multiple channel estimates may be obtained for each slot based on the correlation results for the multiple SSCs for that slot. The correlation result for the PSC for each slot may be multiplied with the multiple channel estimates for that slot to obtain multiple intermediate results. The best (e.g., largest) intermediate result for each slot may be coherently accumulated with the current accumulated result. Alternatively, a channel estimate may be obtained for each slot based on the correlation results for the multiple SSCs for that slot. The correlation result for the PSC for each slot may be multiplied with the channel estimate for that slot to obtain an intermediate result, which may be coherently accumulated with the current accumulated result. Coherent accumulation for the PSC may also be performed in other manners.

Figure 17:
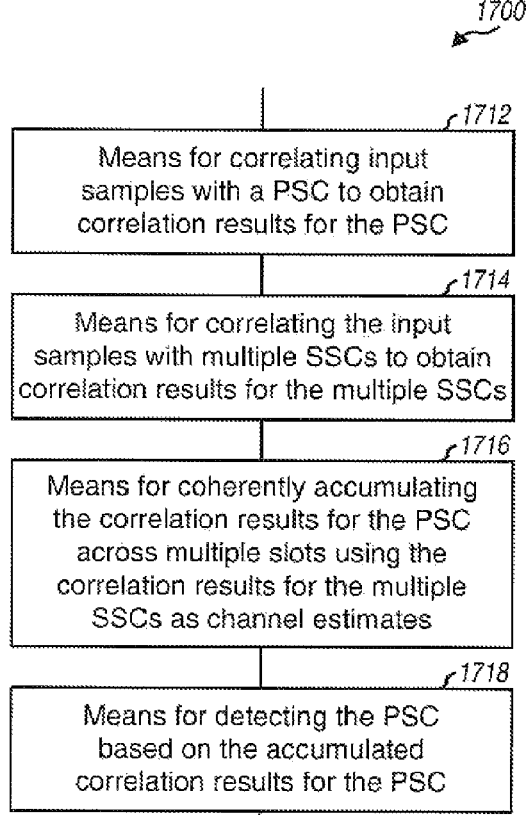

FIG. 17 shows an apparatus 1700 for a receiver. Apparatus 1700 includes means for correlating input samples with a PSC to obtain correlation results for the PSC (block 1712), means for correlating the input samples with multiple SSCs to obtain correlation results for the multiple SSCs (block 1714), means for coherently accumulating the correlation results for the PSC across multiple slots using the correlation results for the multiple SSCs as channel estimates (block 1716), and means for detecting the PSC based on the accumulated correlation results for the PSC (block 1718).

The synchronization codes, PSC and SSCs, described herein may be used for various wireless communication systems, e.g., systems utilizing LCR, LTE, etc. These synchronization codes may also be used with any chip rate but is well suited for a low chip rate such as, e.g., 960 Kcps in 1.25 MHz bandwidth.

The synchronization techniques described herein may be implemented by various means. For example, these techniques may be implemented in hardware, firmware, software, or a combination thereof. For a hardware implementation, the processing units at a given entity (e.g., a Node B or a UE) may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the techniques may be implemented with modules (e.g., procedures, functions, and so on) that perform the functions described herein. The firmware and/or software codes may be stored in a memory (e.g., memory 532 or 582 in FIG. 5) and executed by a processor (e.g., processor 530 or 580). The memory may be implemented within the processor or external to the processor.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

What is claimed is:

1. An apparatus comprising:
   a processor configured to generate a primary synchronization code (PSC) having a length of L chips based on a first inner sequence and a first outer sequence, where L is less than 256, and to generate a sequence of secondary synchronization codes (SSCs) based on a second inner sequence and a second outer sequence, with each SSC having a length of L chips, and wherein a PSC correlation is used as a channel estimate for SSC detection in a receiver or a SSC correlation is used as the channel estimate for PSC detection in the receiver; and
   a memory coupled to the processor.

2. The apparatus of claim 1, wherein L is equal to 64, the PSC has a length of 64 chips, and each SSC has a length of 64 chips.

3. The apparatus of claim 1, wherein the first inner sequence is <1, 1, 1, −1> or <−1, −1, −1, 1>.

4. The apparatus of claim 1, wherein the first outer sequence is <a, a, a, −a, −a, a, −a, −a, a, a, a, −a, a, −a, a, a>, where a denotes the first inner sequence.

5. The apparatus of claim 1, wherein the first inner sequence is $<x_1, x_2, x_3, x_4>$ and the second inner sequence is $<x_1, x_2, -x_3, -x_4>$, where $x_1, x_2, x_3$ and $x_4$ are each a value of 1 or −1.

6. The apparatus of claim 1, wherein the second outer sequence is <b, b, b, −b, b, b, −b, −b, b, −b, b, −b, −b, −b, −b, −b>, where b denotes the second inner sequence.

7. The apparatus of claim 1, wherein each SSC in the sequence of SSCs is selected from a set of SSCs available for use.

8. The apparatus of claim 1, wherein the processor is configured to send the PSC in each of multiple slots of a frame and to send the sequence of SSCs in the multiple slots of the frame, one SSC in each slot.

9. The apparatus of claim 8, wherein the processor is configured to send the PSC and SSC in parallel in each slot.

10. The apparatus of claim 8, wherein the processor is configured to send the PSC and SSC in different time intervals in each slot.

11. The apparatus of claim 1, wherein the processor is configured to send the PSC on multiple subcarriers in at least one Orthogonal Frequency Division Multiplexing (OFDM) symbol period, and to send the sequence of SSCs on multiple subcarriers in at least one other OFDM symbol period.

12. The apparatus of claim 1, wherein the processor is configured to send the PSC and the sequence of SSCs at a chip rate of 960 kilochips/second (Kcps).

13. A method comprising:
using a processor for generating a primary synchronization code (PSC) having a length of L chips based on a first inner sequence and a first outer sequence, where L is less than 256; and
generating a sequence of secondary synchronization codes (SSCs) based on a second inner sequence and a second outer sequence, with each SSC having a length of L chips,
and wherein a PSC correlation is used as a channel estimate for SSC detection in a receiver or a SSC correlation is used as the channel estimate for PSC detection in the receiver.

14. The method of claim 13, wherein the generating the PSC comprises generating the PSC with the first inner sequence of <1, 1, 1, −1> and the first outer sequence of <a, a, a, −a, −a, a, −a, −a, a, a, a, −a, a, −a, a, a>, where a denotes the first inner sequence.

15. An apparatus comprising:
means for generating a primary synchronization code (PSC) having a length of L chips based on a first inner sequence and a first outer sequence, where L is less than 256; and
means for generating a sequence of secondary synchronization codes (SSCs) based on a second inner sequence and a second outer sequence, with each SSC having a length of L chips, wherein a PSC correlation is used as a channel estimate for SSC detection in a receiver or a SSC correlation is used as the channel estimate for PSC detection in the receiver.

16. The apparatus of claim 15, wherein the means for generating the PSC comprises means for generating the PSC with the first inner sequence of <1, 1, 1, −1> and the first outer sequence of <a, a, a, −a, −a, a, −a, −a, a, a, a, −a, a, −a, a, a>, where a denotes the first inner sequence.

17. An apparatus comprising:
a processor configured to detect for a primary synchronization code (PSC) having a length of L chips, where L is less than 256, and to detect for a sequence of secondary synchronization codes (SSCs), with each SSC having a length of L chips, wherein a PSC correlation is used as a channel estimate for SSC detection in a receiver or a SSC correlation is used as the channel estimate for PSC detection in the receiver; and
a memory coupled to the processor.

18. The apparatus of claim 17, wherein L is equal to 64, the PSC has a length of 64 chips, and each SSC has a length of 64 chips.

19. The apparatus of claim 17, wherein the PSC is generated based on an inner sequence of <1, 1, 1, −1> and an outer sequence of <a, a, a, −a, −a, a, −a, −a, a, a, a, −a, a, −a, a, a>, where a denotes the inner sequence.

20. The apparatus of claim 17, wherein the processor is configured
to correlate input samples with the PSC to obtain PSC correlation results,
to accumulate the PSC correlation results across multiple slots, and
to identify at least one candidate for the PSC based on the accumulated PSC correlation results.

21. The apparatus of claim 20, wherein the processor is configured to correlate the input samples with the PSC using a correlator comprised of six cascaded sections associated with six different delays.

22. The apparatus of claim 17, wherein the processor is configured to correlate received symbols for multiple subcarriers with the PSC to obtain PSC correlation results, and to identify the PSC based on the PSC correlation results.

23. The apparatus of claim 17, wherein the processor is configured
to correlate input samples with multiple SSCs based on timing for at least one PSC candidate to obtain SSC correlation results for the multiple SSCs,
to accumulate the SSC correlation results for the multiple SSCs across multiple frames, and
to identify the sequence of SSCs based on the accumulated SSC correlation results.

24. The apparatus of claim 23, wherein the processor is configured to use SSC correlation results for the PSC detection as channel estimates, and to coherently accumulate the SSC correlation results for the multiple SSCs across the multiple frames using the channel estimates.

25. The apparatus of claim 23, wherein the processor is configured to obtain a detected SSC for each of multiple slot indices based on accumulated SSC correlation results for the multiple SSCs for the slot index, and to identify the sequence of SSCs based on multiple detected SSCs for the multiple slot indices.

26. The apparatus of claim 17, wherein the processor is configured to correlate received symbols for multiple subcarriers with multiple SSCs to obtain SSC correlation results for the multiple SSCs, and to identify the sequence of SSCs based on the SSC correlation results.

27. The apparatus of claim 17, wherein the processor is configured to process input samples to detect for a scrambling code from among a group of scrambling codes associated with the sequence of SSCs.

28. The apparatus of claim 17, wherein the processor is configured to perform multiple rounds of detection for the PSC and the sequence of SSCs and to perform detection for the PSC for a next round in parallel with detection for the sequence of SSCs for a current round.

29. A method comprising:
using a processor for detecting for a primary synchronization code (PSC) having a length of L chips, where L is less than 256;
detecting for a sequence of secondary synchronization codes (SSCs), with each SSC having a length of L chips; and wherein a PSC correlation is used as a channel estimate for SSC detection in a receiver or a SSC correlation is used as the channel estimate for PSC detection in the receiver.

30. The method of claim 29, wherein the detecting for the PSC comprises
correlating input samples with the PSC to obtain PSC correlation results,
accumulating the PSC correlation results across multiple slots, and
identifying at least one candidate for the PSC based on the accumulated PSC correlation results.

31. The method of claim 29, wherein the detecting for the sequence of SSCs comprises
correlating input samples with multiple SSCs based on timing for at least one PSC candidate to obtain SSC correlation results for the multiple SSCs,
accumulating the SSC correlation results for the multiple SSCs across multiple frames, and
identifying the sequence of SSCs based on the accumulated SSC correlation results.

32. An apparatus comprising:
means for detecting for a primary synchronization code (PSC) having a length of L chips, where L is less than 256; and
means for detecting for a sequence of secondary synchronization codes (SSCs), with each SSC having a length of L chips, wherein a PSC correlation is used as a channel estimate for SSC detection in a receiver or a SSC correlation is used as the channel estimate for PSC detection in the receiver.

33. The apparatus of claim 32, wherein the means for detecting for the PSC comprises
means for correlating input samples with the PSC to obtain PSC correlation results,
means for accumulating the PSC correlation results across multiple slots, and
means for identifying at least one candidate for the PSC based on the accumulated PSC correlation results.

34. The apparatus of claim 32, wherein the means for detecting for the sequence of SSCs comprises
means for correlating input samples with multiple SSCs based on timing for at least one PSC candidate to obtain SSC correlation results for the multiple SSCs,
means for accumulating the SSC correlation results for the multiple SSCs across multiple frames, and
means for identifying the sequence of SSCs based on the accumulated SSC correlation results.

35. An apparatus comprising:
a processor configured to correlate input samples with a primary synchronization code (PSC) to obtain PSC correlation results, to correlate the input samples with multiple secondary synchronization codes (SSCs) to obtain SSC correlation results, to coherently accumulate the PSC correlation results across multiple slots using the SSC correlation results as channel estimates, and to detect for the PSC based on the accumulated PSC correlation results for the PSC; and
a memory coupled to the processor.

36. The apparatus of claim 35, wherein for each of the multiple slots the processor is configured to obtain multiple channel estimates for the slot based on SSC correlation results for the multiple SSCs, to multiply a PSC correlation result for the slot with the multiple channel estimates to obtain multiple intermediate results, to select an intermediate result from among the multiple intermediate results, and to coherently accumulate the selected intermediate result.

37. The apparatus of claim 35, wherein for each of the multiple slots the processor is configured to obtain a channel estimate for the slot based on SSC correlation results for the multiple SSCs, to multiply a PSC correlation result for the slot with the channel estimate to obtain an intermediate result, and to coherently accumulate the intermediate result.

38. A method comprising:
correlating input samples with a primary synchronization code (PSC) to obtain PSC correlation results;
using at least one correlator for correlating the input samples with multiple secondary synchronization codes (SSCs) to obtain SSC correlation results;
coherently accumulating the PSC correlation results across multiple slots using the SSC correlation results as channel estimates; and
detecting for the PSC based on the accumulated PSC correlation results.

39. An apparatus comprising:
a processor configured to correlate input samples with a primary synchronization code (PSC) using a correlator comprised of at least six cascaded sections associated with at least six different delays, and to obtain PSC correlation results from a sixth section of the correlator if the PSC has a length of 64 chips, a PSC correlation is used as a channel estimate for SSC detection in a receiver or a SSC correlation is used as the channel estimate for PSC detection in the receiver; and
a memory coupled to the processor.

40. The apparatus of claim 39, wherein the processor is configured to use six different delays and six weights for six sections of the correlator, one delay and one weight for each section, if the PSC has a length of 64 chips.

41. The apparatus of claim 39, wherein the processor is configured to obtain PSC correlation results from an eighth section of the correlator if the PSC has a length of 256 chips.

42. The apparatus of claim 41, wherein the processor is configured to use eight different delays and eight weights for eight sections of the correlator, one delay and one weight for each section, if the PSC has a length of 256 chips.

43. The apparatus of claim 39, wherein each of the at least six sections comprises
a delay unit configured to receive a first input and to provide a delay associated with the section,
a multiplier configured to receive a second input and to multiply the second input with a weight for the section,
a first summer configured to sum outputs of the delay unit and the multiplier and provide a first output, and
a second summer configured to subtract output of multiplier from output of the delay unit and provide a second output.

* * * * *